(12) United States Patent
Hatley et al.

(10) Patent No.: US 6,525,500 B2
(45) Date of Patent: Feb. 25, 2003

(54) APPARATUS FOR ROBOTICALLY INSPECTING GAS TURBINE COMBUSTION COMPONENTS

(75) Inventors: Kenneth John Hatley, Madison, NJ (US); Richard Michael Hatley, Madison, NJ (US); Sean Michael McDonnell, Aberdeen, NJ (US); Michael John Bousquet, West Milford, NJ (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/058,428

(22) Filed: Jan. 30, 2002

(65) Prior Publication Data

US 2002/0089298 A1 Jul. 11, 2002

Related U.S. Application Data

(62) Division of application No. 09/739,356, filed on Dec. 19, 2000.

(51) Int. Cl.[7] .............................. B25J 5/00; G05B 19/19
(52) U.S. Cl. .............................. 318/568.12; 318/568.11; 318/568.2; 382/103; 376/249; 376/260
(58) Field of Search ................... 318/568.11, 568.12, 318/568.2; 364/424.02; 382/103; 376/134, 143, 249, 260

(56) References Cited

U.S. PATENT DOCUMENTS

| | | | |
|---|---|---|---|
| 3,778,170 A | | 12/1973 | Howell et al. |
| 4,788,440 A | * | 11/1988 | Pryor |
| 5,173,248 A | * | 12/1992 | Shibanuma et al. ........ 376/260 |
| 5,285,484 A | * | 2/1994 | Shibanuma et al. ........ 376/260 |
| 5,350,033 A | * | 9/1994 | Kraft ........................ 180/167 |
| 5,377,310 A | | 12/1994 | Jain et al. |
| 5,404,290 A | * | 4/1995 | Tsuchihashi et al. ... 364/167.01 |
| 5,737,500 A | * | 4/1998 | Seraji et al. ................... 395/86 |
| 5,751,610 A | | 5/1998 | Gan et al. |
| 5,768,768 A | | 6/1998 | Best |
| 5,878,151 A | * | 3/1999 | Tang et al. ................. 382/103 |
| 5,992,232 A | * | 11/1999 | Saitoh ......................... 73/468 |

FOREIGN PATENT DOCUMENTS

| | | | |
|---|---|---|---|
| DE | 19924607 A | 11/2000 | |
| EP | 0800892 A | 10/1997 | |
| EP | 1216797 A1 * | 12/2000 | .............. B25J/5/00 |
| EP | 1216796 A1 * | 12/2001 | .............. B25J/5/00 |
| JP | 06-328373 * | 11/1994 | .............. B25J/5/02 |
| JP | 08-257953 * | 10/1996 | .............. B25J/5/02 |
| JP | 2000-162350 * | 6/2000 | .............. B25J/5/02 |

* cited by examiner

*Primary Examiner*—Marlon T. Fletcher
*Assistant Examiner*—Tyrone Smith
(74) *Attorney, Agent, or Firm*—Nixon & Vanderhye

(57) ABSTRACT

A robotic inspection system for gas turbine combustion components includes an exterior manipulator for visual inspection of the exterior surface of the impingement sleeve, an interior manipulator for visual inspection of the interior of the transition piece body and an annulus manipulator for inspecting the side weld seams of the transition piece body. The exterior manipulator includes an arcuate segment extending about the annular spaced impingement sleeves and a robotic subassembly including a linear rail and an upper arm and forearm mounting an inspection head pivotally coupled to one another for visual inspection of the top, bottom and side external surfaces of the impingement sleeve. The interior manipulator mounts to the open end of the combustion casing and includes an arm mounted for universal pivotal movement to the mount, actuators for pivoting the arm and motors for extending and rotating an inspection head about pan and tilt axes within the interior of the transition piece body. The annulus manipulator includes a guide plate mounted to the combustor casing and having contoured surfaces tracking the side weld seams. A carriage mounts an inspection head and tracks along the contoured surfaces to track along the seam, affording remote visual inspection thereof.

8 Claims, 18 Drawing Sheets

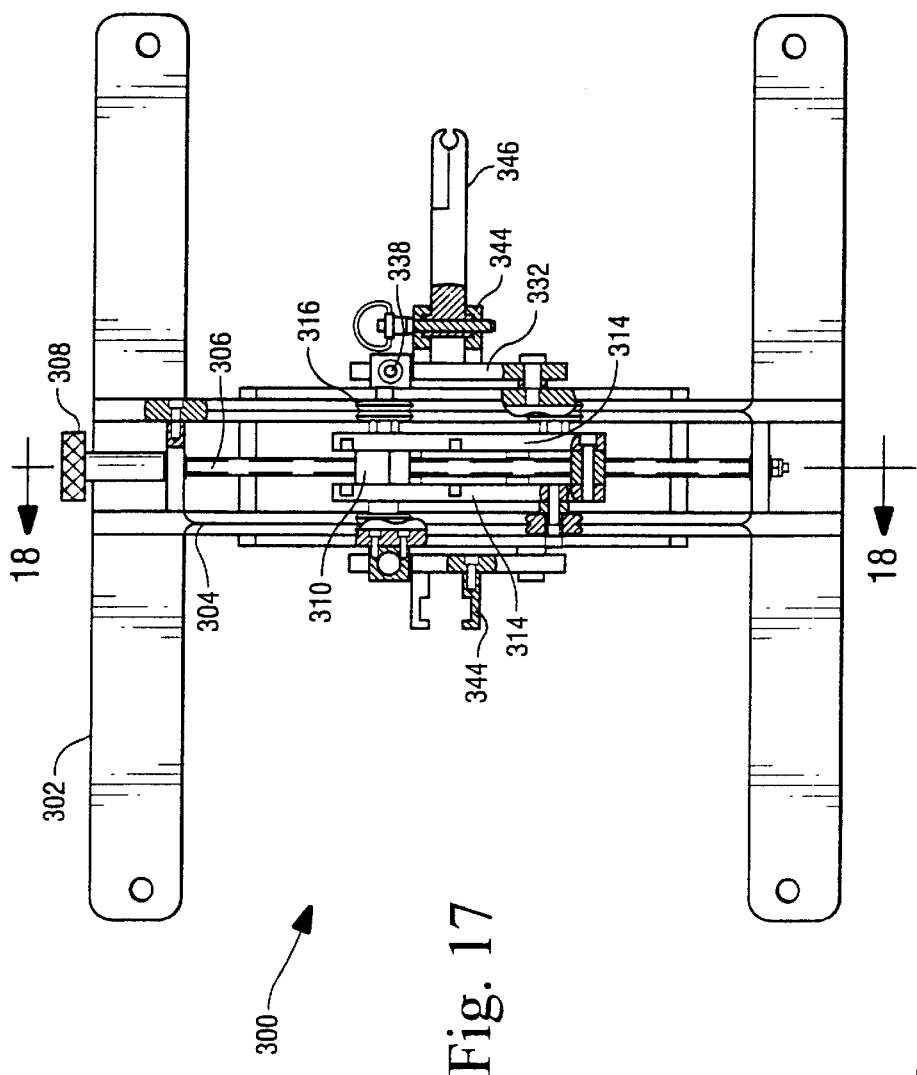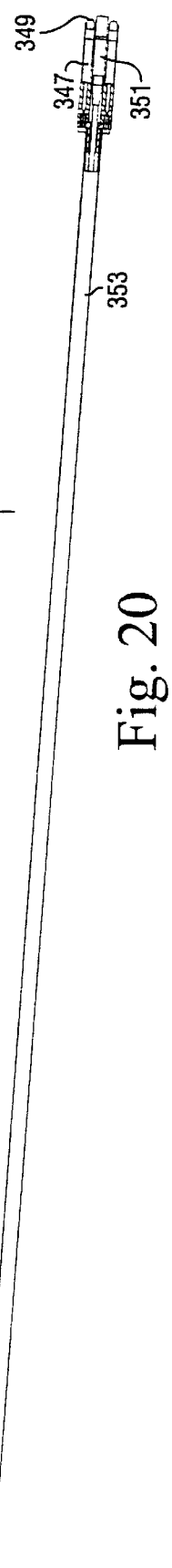

APPARATUS FOR ROBOTICALLY INSPECTING GAS TURBINE COMBUSTION COMPONENTS

RELATED APPLICATIONS

This application is a divisional of application Ser. No. 09/739,356, filed Dec. 19, 2000, the disclosure of which is incorporated herein by reference.

BACKGROUND OF THE INVENTION

The present invention relates to a robotic inspection system for in situ inspection of gas turbine cannular combustion components for the purpose of evaluating the condition of the components.

Maintenance costs and equipment availability are two of the most important concerns of a gas turbine operator. Proper maintenance is required to minimize equipment downtime and provide long-term reliable operation. Maintenance inspections of gas turbines are broadly classified as standby, running and disassembly. Disassembly inspections are generally categorized into three types: combustion inspection, hot gas path inspection and major inspection. All three types of inspections require shutdown and disassembly of the turbine to varying degrees to enable inspection and replacement of aged and worn components. The combustion inspection includes evaluation of several components of the combustion system including the transition piece. The transition piece is a thin-walled duct used to conduct high-temperature combustion gases from the combustion chamber to the annular turbine nozzle passage. The transition piece and other combustion components are generally inspected for foreign objects, abnormal wear, cracking, thermal barrier coating TBC condition, oxidation/corrosion/erosion, hot spots/burning, missing hardware and clearance limits. Components which fall outside established threshold limits are replaced to maintain optimum operating conditions for the entire system. If not rectified, these conditions could lead to reduced machine efficiency and damage to the turbine that may result in unplanned outages and significant repair costs.

Removal and installation of transition pieces is the most time-intensive operation of the combustion inspection. This operation contributes most significantly to the combustion inspection outage duration and corresponds directly to time lost producing power. To remove transition pieces, all upstream components must be removed, i.e., fuel nozzles, water injectors and various other hardware. Each transition piece is then dismounted and removed one by one in sequence through two access openings in the turbine casing. It will be appreciated that for certain gas turbines, there can be as many as fourteen transition pieces requiring removal.

To date, recommended practice has been to remove the transition pieces and other combustion components to facilitate inspection and refurbishment. Inspection has consisted primarily of visual methods consisting of the unaided eye with auxiliary lighting. Visual methods in known problem areas have been enhanced with the use of liquid red dye penetrant to improve visibility of small hairline cracking. These inspections have typically been performed offline of the combustion inspection process. Such prior inspection practices have many disadvantages, including the time required for disassembly and installation, the lack of direct retrievable defect data for engineering evaluation and historical comparison and complete reliance on human factors. Accordingly, there is a need for more efficient methods to inspect the transition pieces of the gas turbine combustion systems to minimize outage times while providing an accurate assessment of the condition of each transition piece.

BRIEF DESCRIPTION OF THE INVENTION

In accordance with a preferred embodiment of the present invention, there is provided a robotic inspection system for gas turbine combustion components comprised of three robotic manipulators with miniature cameras and lighting for inspecting various parts of the transition piece of each combustor in situ. The manipulators are driven remotely using a combination of automated and manual motion control to position the inspection heads, e.g., video cameras, lighting and/or measuring devices, to various locations about and in the combustor enabling a detailed visual inspection of its transition piece and flow sleeve without disassembly and removal of these components from the turbine. The robotic inspection system hereof is thus intended for use during a gas turbine maintenance outage.

Particularly, the robotic inspection system hereof includes three tools, i.e., an exterior manipulator, an interior manipulator and an annulus manipulator. It will be appreciated that the transition piece includes an outer impingement sleeve, typically perforated, and an interior transition piece body defining generally an annulus therebetween. The forward ends of the transition piece body and impingement sleeve are generally circular in configuration with top and bottom sides being flattened progressively toward the first-stage nozzle. The exterior manipulator is deployed for inspection of the external surfaces of the impingement sleeve and has seven distinct motions. The exterior manipulator includes a segmented arcuate rail movably mounted on a carriage disposed within the casing of the turbine, the carriage being supported externally of the casing by a mast. When all of the arcuate rail segments are connected end-to-end to one another, the rail extends in excess of 90° such that an inspection head forming part of a robotic inspection subassembly carried on an end segment can inspect top, bottom and side surfaces and along the entire length of each impingement sleeve in a quadrant of the annularly arranged combustors.

The robotic inspection subassembly on the end segment mounts a generally axially extending rail on which is mounted an upper arm. The rail is movable in a circumferential direction with the arcuate segments as the latter are displaced circumferentially along the carriage to locations radially outwardly of the impingement sleeves and within the interior surface of the casing. The upper arm is pivotable relative to the rail about a first axis to extend between adjacent impingement sleeves and carries at its distal end a pivotally mounted forearm. The upper arm is also rotatable about its long axis such that when the forearm is extended, the inspection head carried at the distal end of the forearm can be located between and radially inwardly of an impingement sleeve for inspection of its radial inner surface. The inspection head is rotatable about pan and tilt axes relative to the forearm and includes a vision module, e.g., one or more cameras and a lighting system. With this arrangement, the inspection head can be located to inspect the entire peripheral surface of each impingement sleeve of the cannular combustion system. A video micrometer external to the tool may be used in conjunction with the vision module to effect measurements.

The interior manipulator is mounted to the aft combustion casing for inspecting the interior surface of the transition piece body. The interior manipulator includes an elongated arm carried in a spherical bearing in a mount secured to the casing flange. The interior end of the arm carries an inspection head similar to that of the exterior manipulator. The arm projects through the mount exteriorly of the casing and is pivoted by two linear actuators coupled between the mount and the arm to locate the inspection head adjacent the interior surface of the transition piece body. The arm also carries concentric inner and outer tubes. Actuation of an electric motor carried by the outer tube extends and retracts the inner tube carrying the inspection head. The inner tube carries pan and tilt motors such that the inspection head can be rotated about pan and tilt axes for visual inspection of the interior surfaces of the transition piece body.

The annulus manipulator includes a manually positioned inspection head for inspecting the side seam welds along the exterior surface of the transition piece body in the annulus between the transition piece body and the impingement sleeve. The annulus manipulator includes a support structure for supporting a pair of spaced guide plates each having a pair of contoured surfaces, e.g., grooves in opposition to one another. The grooves generally correspond to the contours of the side seam welds of the transition piece body. A middle carriage plate carries sets of pins on opposite sides thereof engaging in the grooves and is movable longitudinally along the guide plates. The middle carriage plate also carries side carriage plates for movement along respective laterally facing external surfaces of the guide plates. Each side carriage plate carries a holder for a wand tube which carries the inspection head. With the annulus manipulator located within the casing and the wand tube secured to one of the wand carriers, the side carriage plates are advanced toward the transition piece body by manually advancing the wand tube. As the side carriage plates are advanced, they follow the contour of the grooves which enables the inspection head to follow the contour of a side seam weld. Thus, by positioning the inspection head relative to the annulus manipulator, the inspection head can be located directly adjacent a side seam weld of the transition piece body and displaced lengthwise along the transition piece body thereby following and registering with the contour of the weld.

It will be appreciated that the cameras for the inspection heads can be remotely and dynamically focused from a remote control station. To accomplish this, motorized cam assemblies are utilized that move the camera lens. Additionally, a video micrometer subsystem is used to quantitatively dimension features appearing in the video imagery. For example, a pair of laser lights at a fixed distance apart are incorporated into the inspection head of the interior robotic manipulator. The lasers provide a known size feature used to calibrate the video micrometer for any camera field of view. A similar process may be used for the exterior manipulator, although known size features of the transition piece body are used as the calibration reference rather than lasers.

In a preferred embodiment according to the present invention, there is provided apparatus for in situ inspection of the exterior surface of an impingement sleeve of one of a plurality of an annular array of combustors for a gas turbine wherein the turbine has an outer casing about an axis of rotation of a turbine rotor and at least one opening through the casing for access to the impingement sleeve, comprising a manipulator having an arcuate segment and a carriage for supporting the segment within the casing for movement in a circumferential direction about the annular array of combustors, a rail carried by the segment, a first arm carried by the rail for translatory movement therealong and pivotal movement relative to the rail about a first axis generally normal to the axis of rotation of the rotor, a second arm coupled at one end to the first arm for pivotal movement about a second axis normal to a plane containing the first arm and the second arm and an inspection head carried by the second arm adjacent an opposite end thereof for pivotal movement about pan and tilt axes perpendicular to one another.

In a further preferred embodiment according to the present invention, there is provided apparatus for in situ inspection of the exterior surface of an impingement sleeve of one of a plurality of an annular array of combustors for a gas turbine wherein the turbine has an outer casing about an axis of rotation of a turbine rotor and at least one opening through the casing for access to the impingement sleeve, comprising a manipulator having an arcuate segment and a carriage for supporting the segment within the casing for movement in a circumferential direction about the annular array of combustors, a rail carried by the segment, a first arm carried by the rail for translatory movement therealong and pivotal movement relative to the rail, a second arm connected to the first arm for pivotal movement, an inspection head carried by the second arm for movement about pan and tilt axes perpendicular to one another, the segment including a plurality of discrete arcuate segments connected endwise to one another and extending arcuately about at least the one combustion and a slider for sliding along the rail and carrying the first and second arms and the inspection head.

BRIEF DESCRIPTION OF THE DRAWINGS

FIG. 5 is an enlarged cross-sectional view of the interior manipulator of FIG. 14;

FIG. 17 is an end elevational view of an annulus inspection manipulator according to the present invention;

FIG. 20 is a plan view of a wand tube forming part of the annulus inspection manipulator hereof.

DETAILED DESCRIPTION OF THE INVENTION

Figure 1:
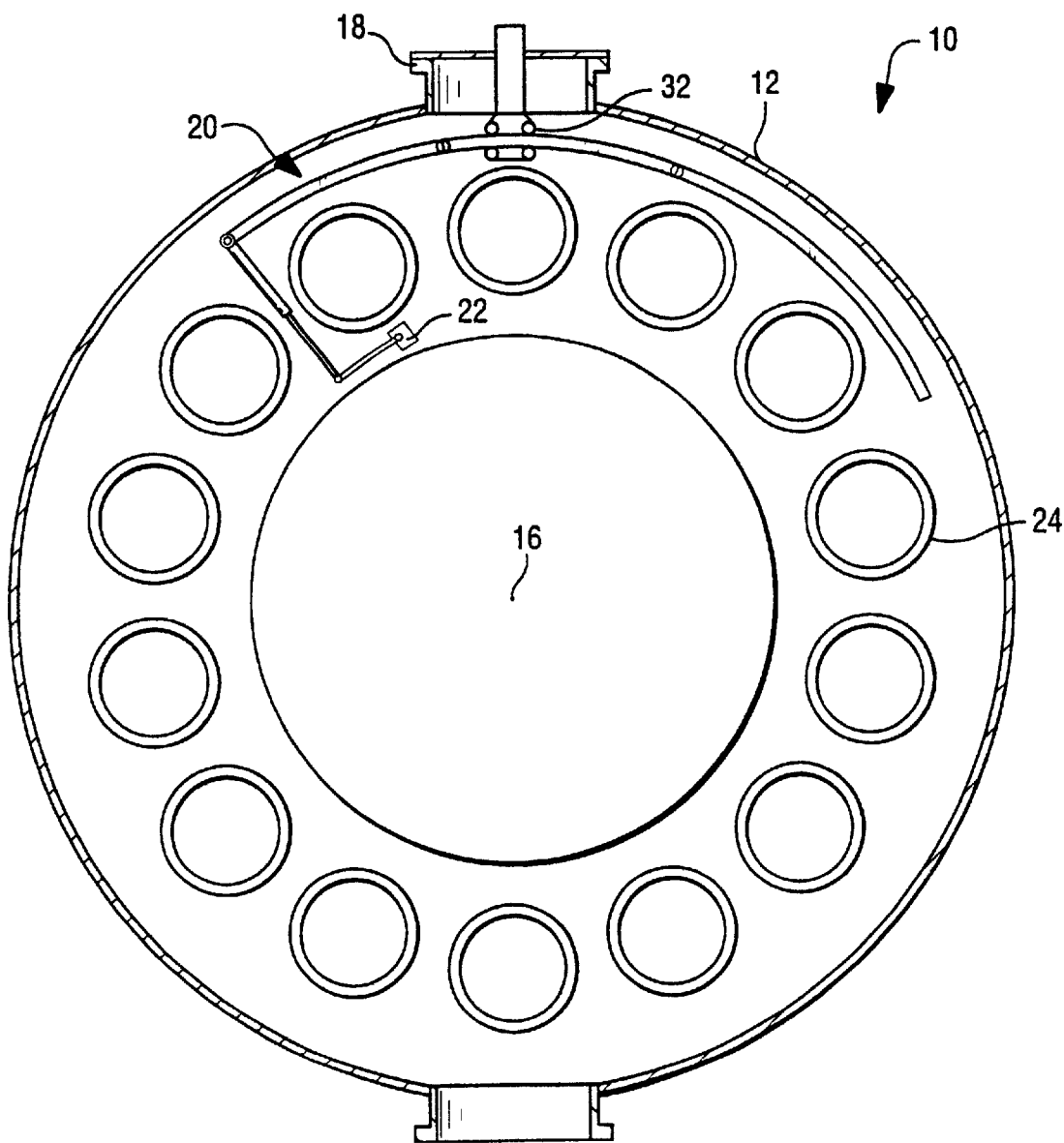
FIG. 1 is a schematic illustration of an annular array of combustors about a gas turbine axis.

Referring now to the drawings, particularly to FIG. 1, there is schematically illustrated an axial view of a gas turbine, generally designated 10, having an outer casing 12 and an annular array of combustors including combustion flow sleeves 14 within the casing 12. The rotational axis of the gas turbine rotor, not shown, is indicated at 16. Also illustrated in FIG. 1 is an access opening or manhole 18 through which an external manipulator, generally designated 20, is inserted for inspecting the external surface of each of the impingement sleeves of the transition pieces. By manipulating the external manipulator 20, an inspection head 22 may be displaced axially the full length of the impingement sleeve as well as positioned at any location about the entire external peripheral surface of the impingement sleeve.

Figure 2:
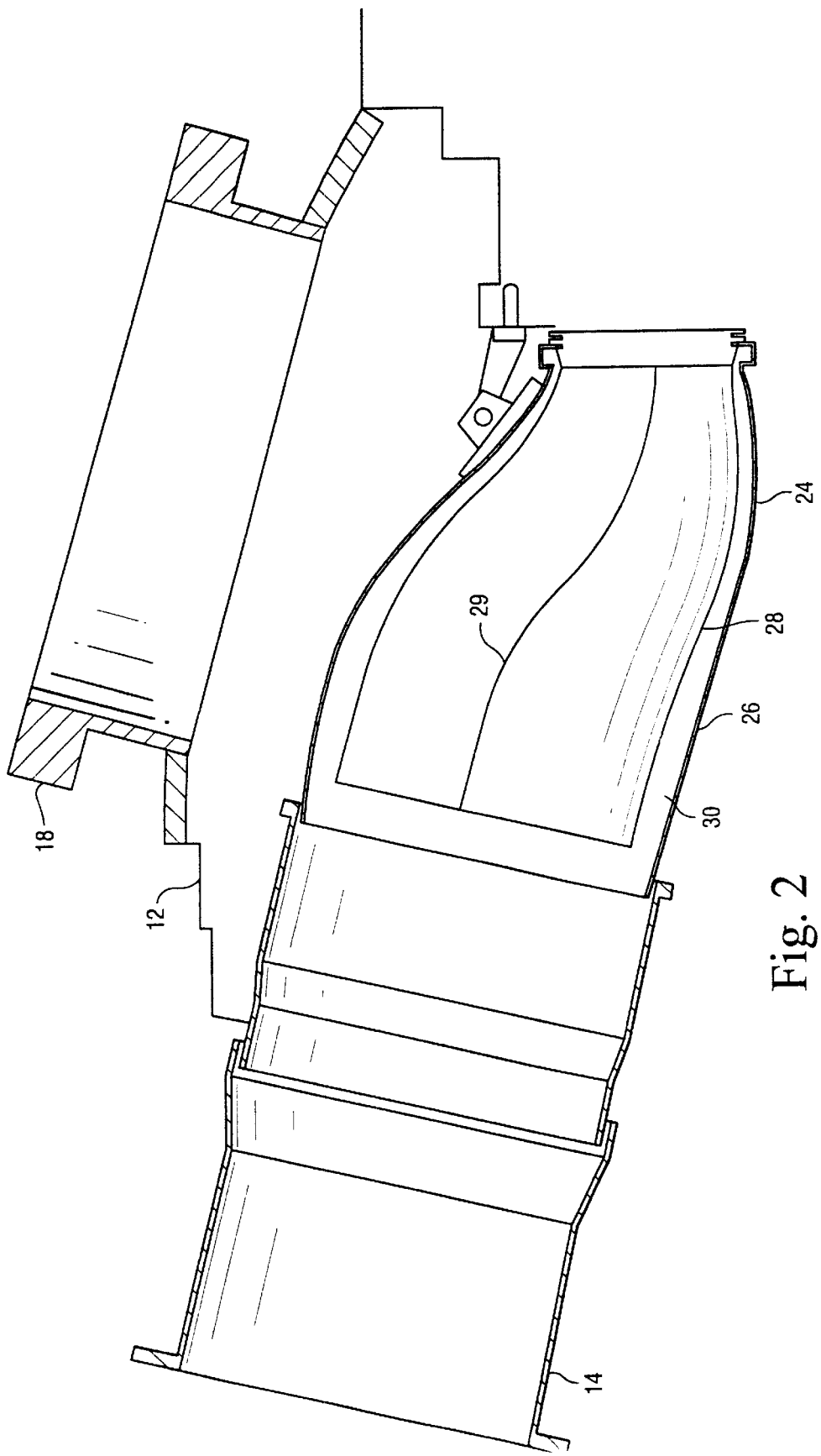
FIG. 2 is a fragmentary side elevational view of a combustor flow sleeve and a transition piece of a combustor illustrating an access opening.

Referring now to FIG. 2, there is illustrated a flow sleeve 14 and a transition piece 24, the transition piece including an impingement, i.e., perforated sleeve 26 surrounding a transition piece body 28. Body 28 extends generally axially from adjacent the forward end of the impingement sleeve 26 and is connected at its rearward end to the first-stage nozzle, not shown, of the gas turbine for flowing hot gases of combustion into the first-stage nozzle. The impingement sleeve 26 and transition piece body 28 are generally circular at their forward ends and flatten out toward their rearward ends, terminating in a generally rectilinear opening for flowing the gases into the first-stage nozzle. The surfaces of the impingement sleeve 26 and transition piece body 28 generally conform with one another and are spaced one from the other, defining a generally annular space 30 between the surfaces of the sleeve and body. As noted previously, the combustion system component and more particularly the transition piece inspection system of the present invention includes three inspection tools, namely: an exterior manipulator, an interior manipulator and an annulus tool. The exterior manipulator is designed to inspect the external surface of the impingement sleeve 26 for damage to the zipper welds, aft brackets and bullhorns. The interior manipulator is designed to inspect the inside surface of the transition piece body 28 for cracking, corrosion and the like and particularly for ensuring that the thermal barrier coating is intact. The annulus tool inspects the exterior surface of the side seam welds 29 securing upper and lower halves of the transition piece body to one another.

Figure 4:
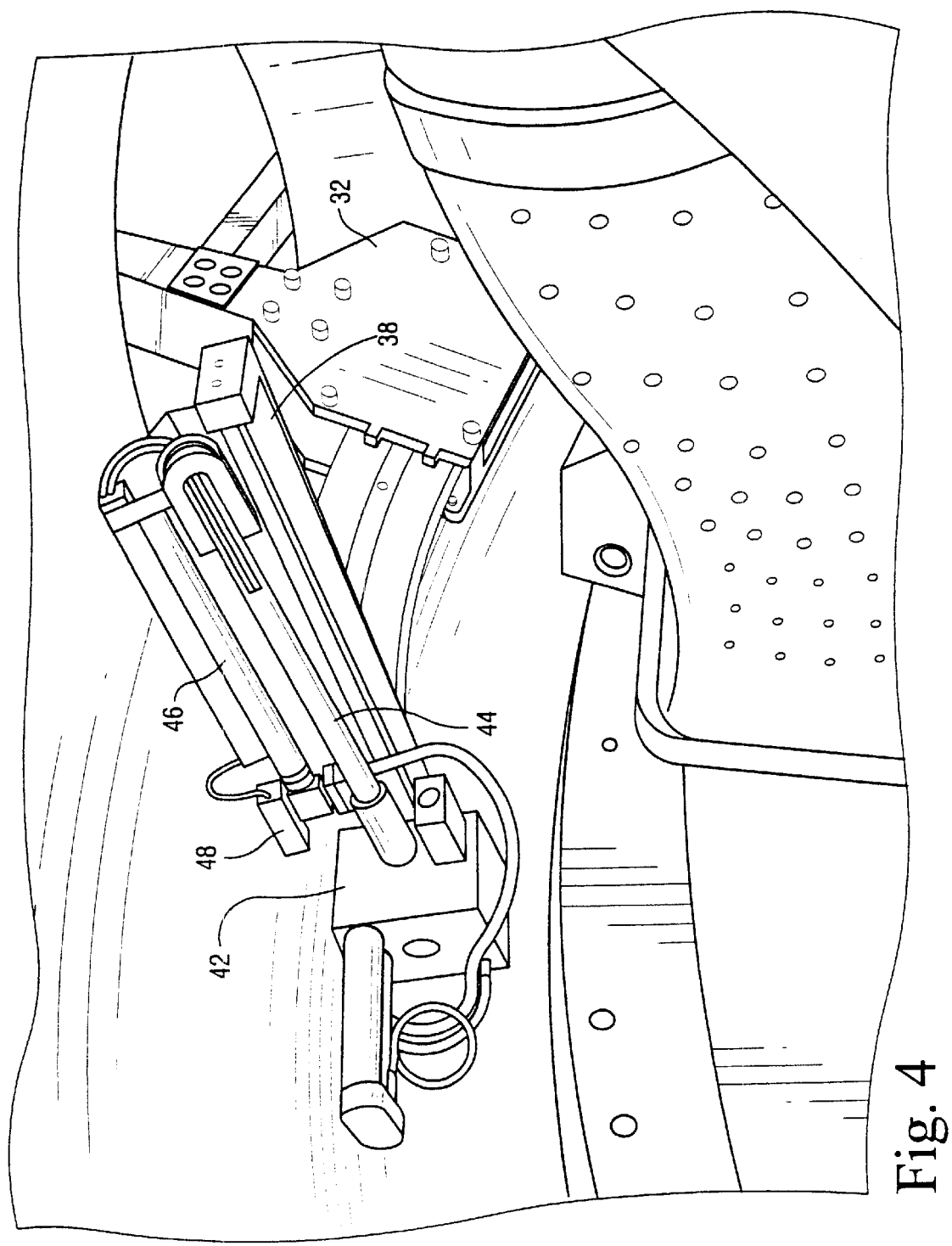
FIG. 4 is a perspective view illustrating an exterior manipulator within the turbine casing adjacent an impingement sleeve.
Figure 5:
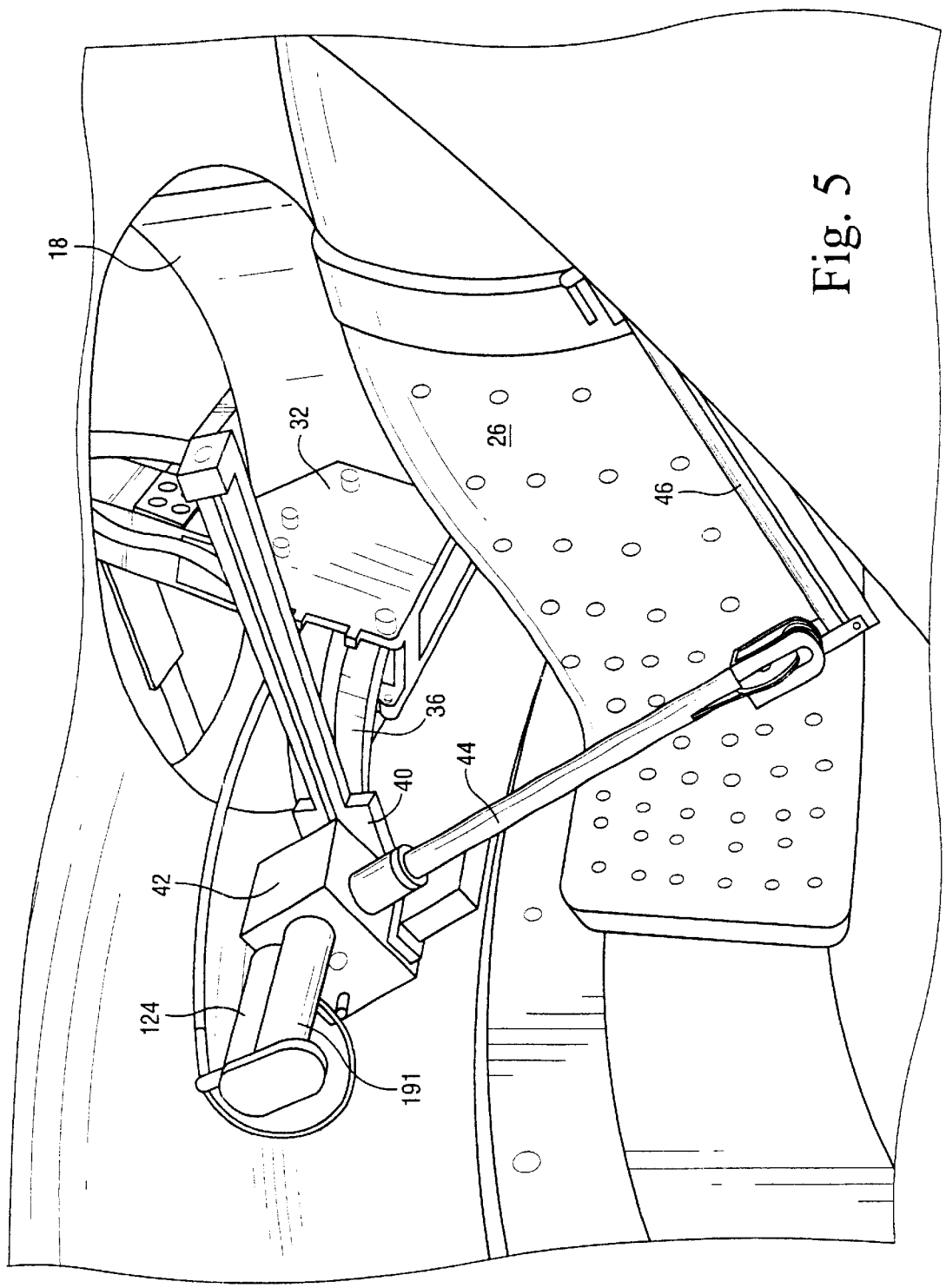
FIG. 5 is a view similar to FIG. 4 with an upper arm and forearm of the exterior manipulator rotated and extended, respectively.
Figure 6:
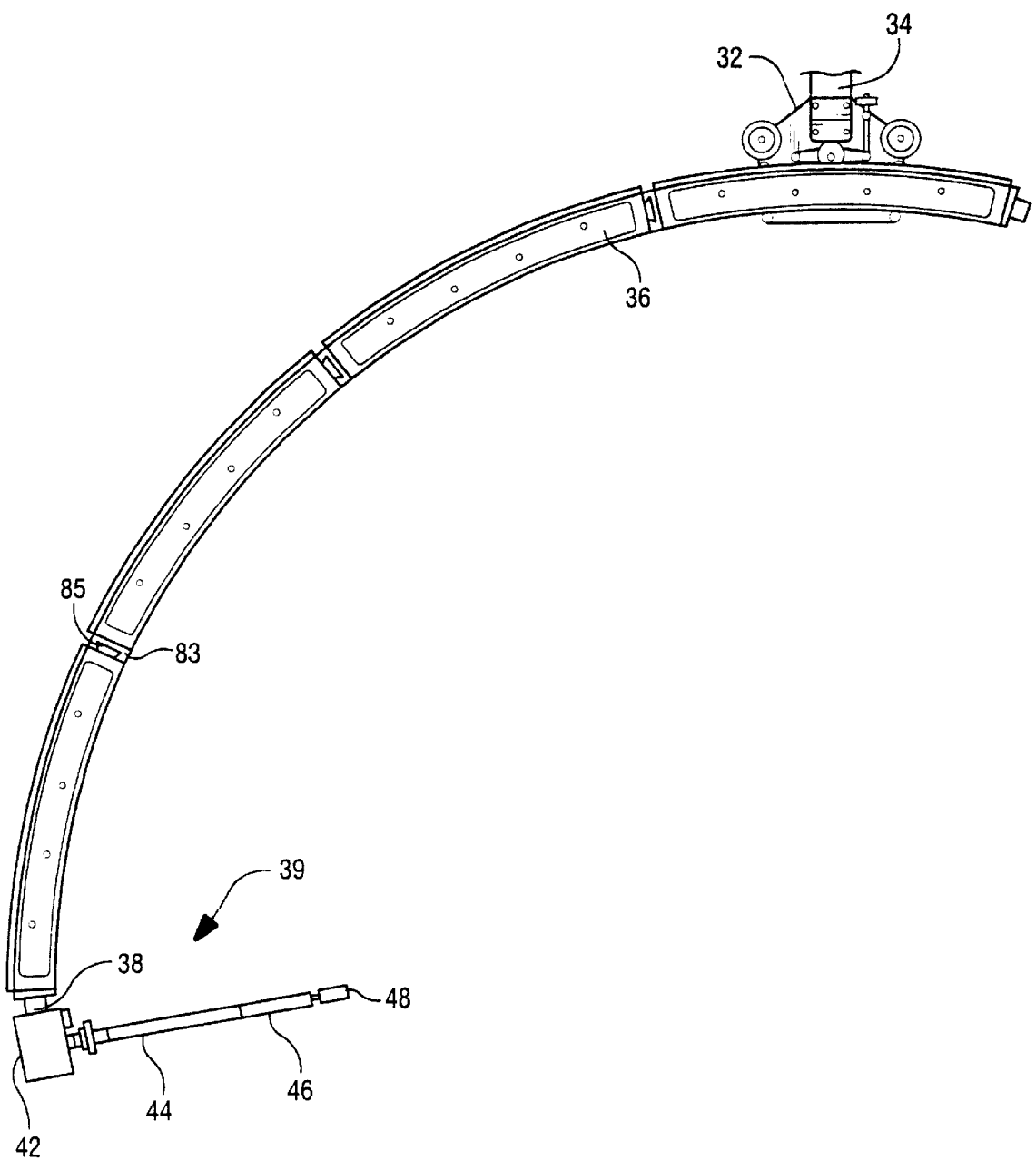
FIG. 6 is an axial end view of a segmented rail forming part of the exterior manipulator.
Figure 10:
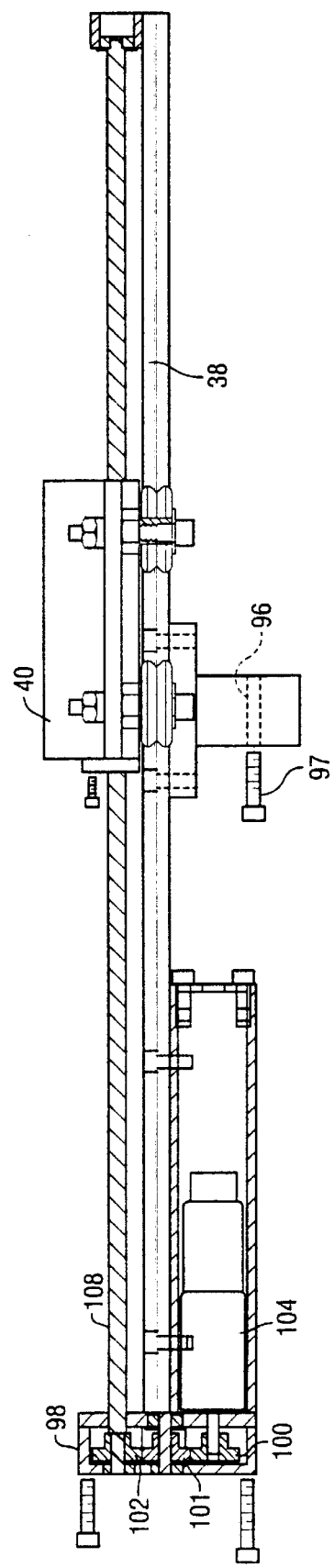
FIG. 10 is a plan view of the rail of FIG. 9.
Figure 11:
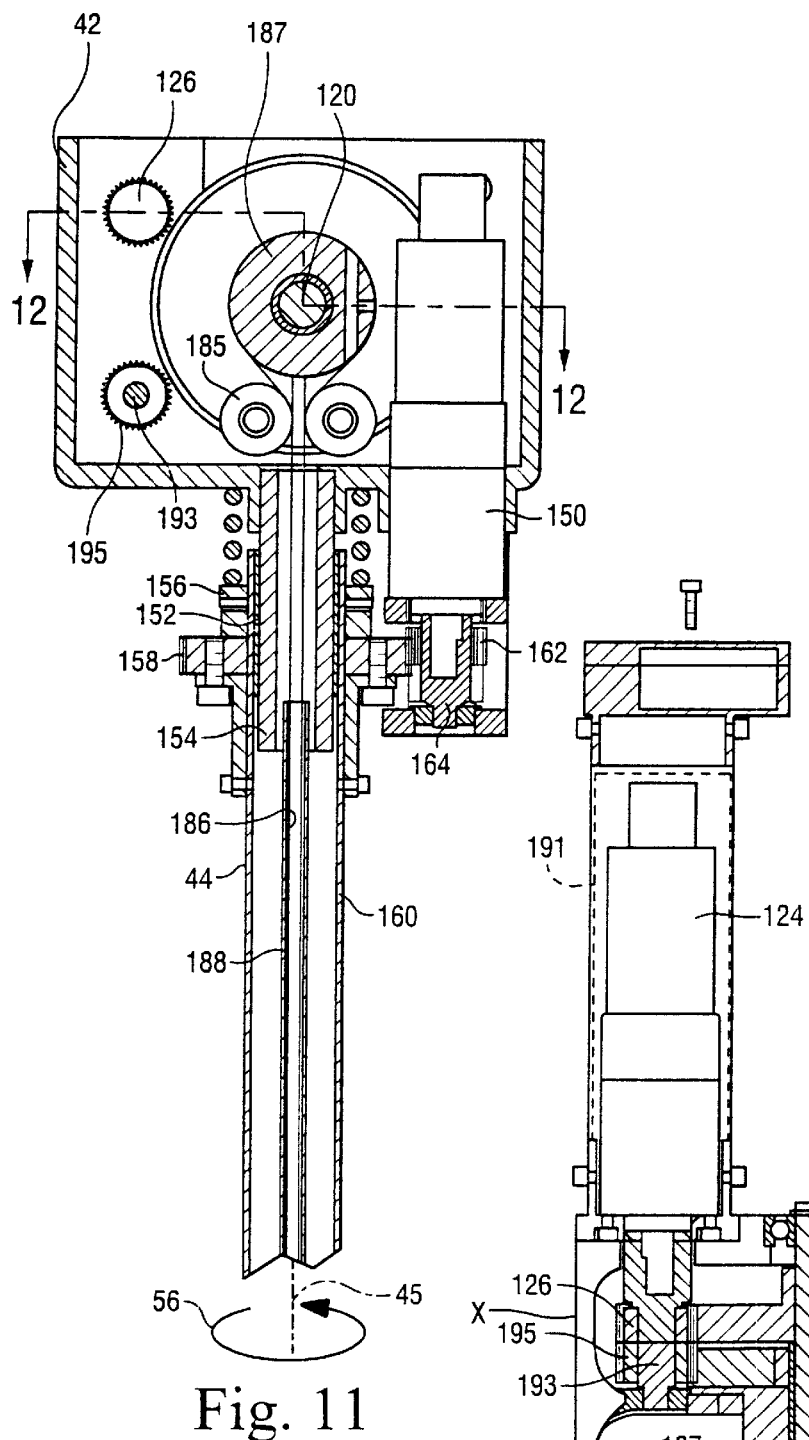
FIG. 11 is an enlarged cross-sectional view of a gearbox carried by the slider on the rail of FIGS. 9 and 10.
Figure 12:
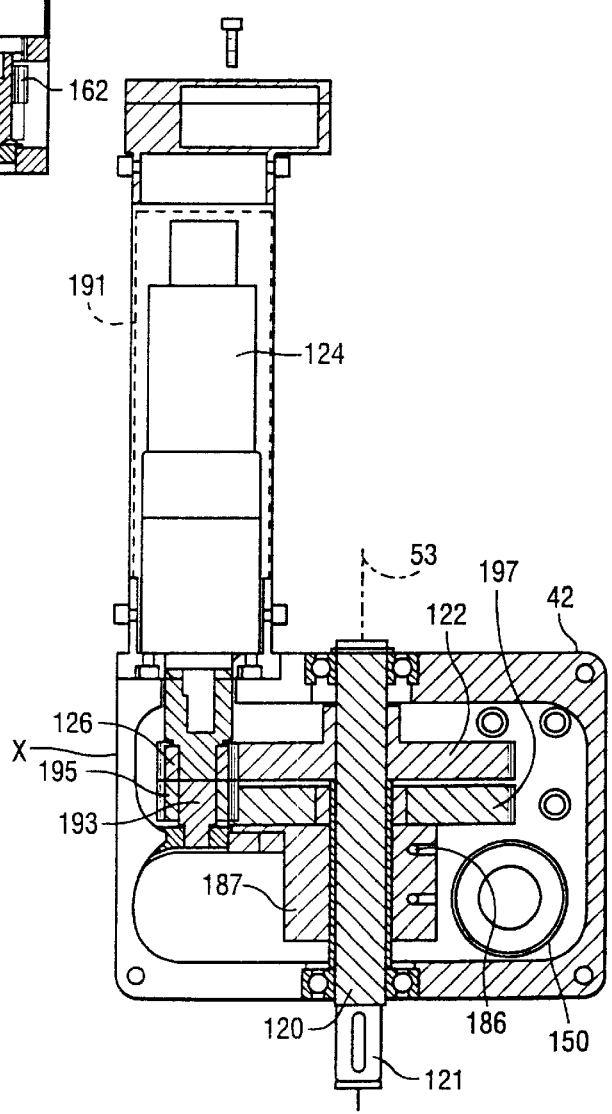
FIG. 12 is a cross-sectional view taken about on line 12—12 in FIG. 11.

Referring first to the exterior manipulator 20, and with reference to FIGS. 4–6, manipulator 20 is inserted in sections through the access opening 18 and includes a support carriage 32 connected to a mast 34 secured externally of casing 12 to support the manipulator 20 within the casing 12. The carriage 32, in turn, supports a plurality of arcuate segments 36 connected one to the other and which segments extend along an arc in excess of 90° in a plane perpendicular to the rotor axis 16. It will be appreciated that access openings 18 are provided at locations 180° apart about casing 12. Accordingly, by providing an external manipulator having segments 36 extending in assembly in excess of 90°, an inspection head at the end of the segments 36, and having two access openings 18 at locations 180° apart, each of the impingement sleeves can be inspected by the inspection head in each quadrant about axis 16 adjacent an access opening 18. The distal end of the arcuate segments 36 carries a robotic inspection system subassembly, generally designated 39 (FIG. 6), including a rail 38 which extends in a general axial direction relative to the turbine rotor axis 16. Rail 38, in turn, carries a slider 40 (FIG. 10) mounting a shoulder gearbox 42 (FIGS. 11 and 12). Projecting from gearbox 42 is an upper or first arm 44 (FIG. 13) pivotally carrying a second arm, i.e., a forearm 46. At the distal end of forearm 46 is an inspection head 48 mounted for movement axially relative to forearm 46 and in pan and tilt directions.

To facilitate an understanding of the movements of the external manipulator 20 prior to describing its component parts, the various motions of the external manipulator will be described with respect to FIG. 3. The rotational axis of the gas turbine is indicated 16 in FIG. 3. The arcuate segments 36 lie in a plane perpendicular to axis 16. The rail 38 extends generally parallel to axis 16 and moves with the arcuate segments 36 in a circumferential direction about axis 16 as indicated by the double-ended arrow 50. The shoulder gearbox 42 mounted on slider 40 moves with slider 40 in a generally axial direction along the rail 38, generally parallel to axis 16, thus displacing the upper arm 44, forearm 46 and inspection head 48 in a forward and aft direction generally parallel to axis 16. This linear movement of gearbox 42 is indicated by the double-ended arrow 52 in FIG. 3. The shoulder gearbox 42 also causes rotation of the upper arm 44, forearm 46 and the inspection head 48 carried at the distal end of forearm 46 about a generally tangential first axis 53, the rotary motion about first axis 53 being indicated by the arcuate double-ended arrow 54. Gearbox 42 also rotates the upper arm 44 about its long axis 45 and which rotational movement about rotational axis 45 is indicated by the arcuate double-ended arrow 56. Forearm 46 is pivotally mounted to the distal end of upper arm 44 for rotation about a second axis 57 extending through the elbow joint between the upper arm 44 and the forearm 46 and perpendicular to a plane containing upper arm 44 and forearm 46. The rotational direction is illustrated by the arcuate double-ended arrow 58 about axis 57 in FIG. 3. It will be appreciated that axes 53 and 57 are also parallel to one another. Inspection head 48 mounted on the distal end of forearm 46 is rotatable in pan and tilt directions. That is, inspection head 48 is rotatable about the axis 59 of forearm 46 in pan and which rotation about axis 59 is indicated by the arcuate double-ended arrow 60. Inspection head 48 is also rotatable in tilt about an axis 61 perpendicular to the axis 59 of forearm 46 and which rotation about axis 61 is indicated by the arcuate double-ended arrow 62. Consequently, it will be appreciated that the inspection head 48 has seven degrees of freedom of movement.

Figure 7:
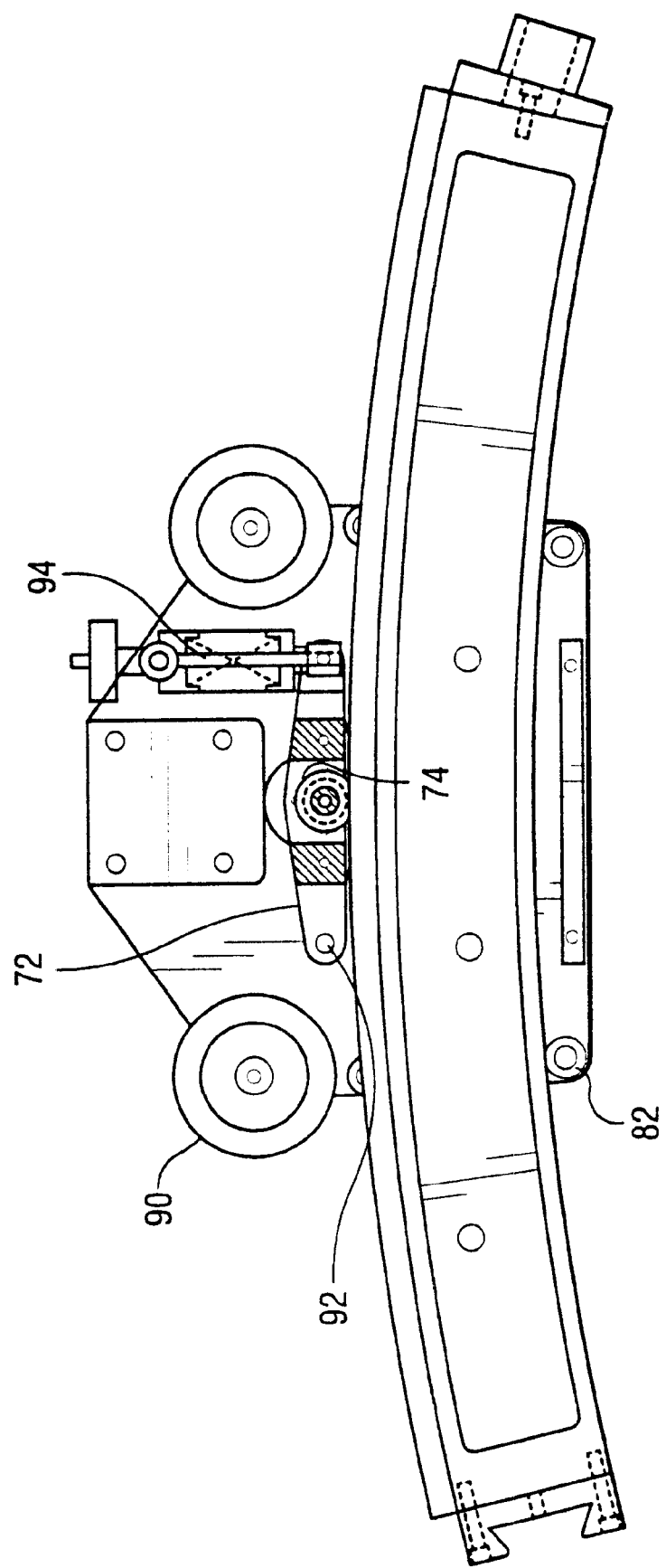
FIG. 7 is an enlarged view of a segment of the arcuate segmented rail and a support carriage therefor.
Figure 8:
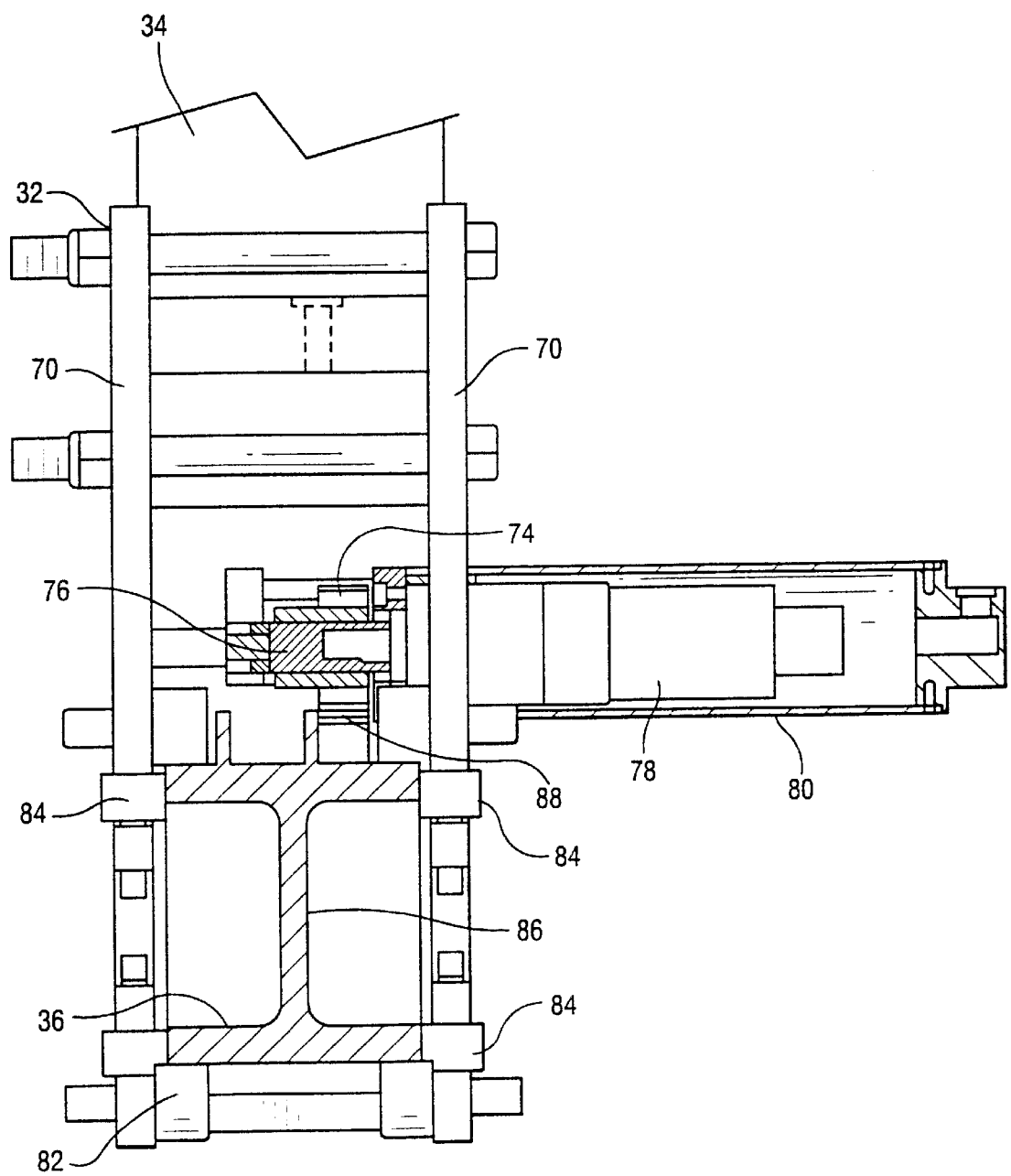
FIG. 8 is an enlarged cross-sectional view of the carriage and segment of FIG. 7 illustrating the drive therebetween.
Figure 9:
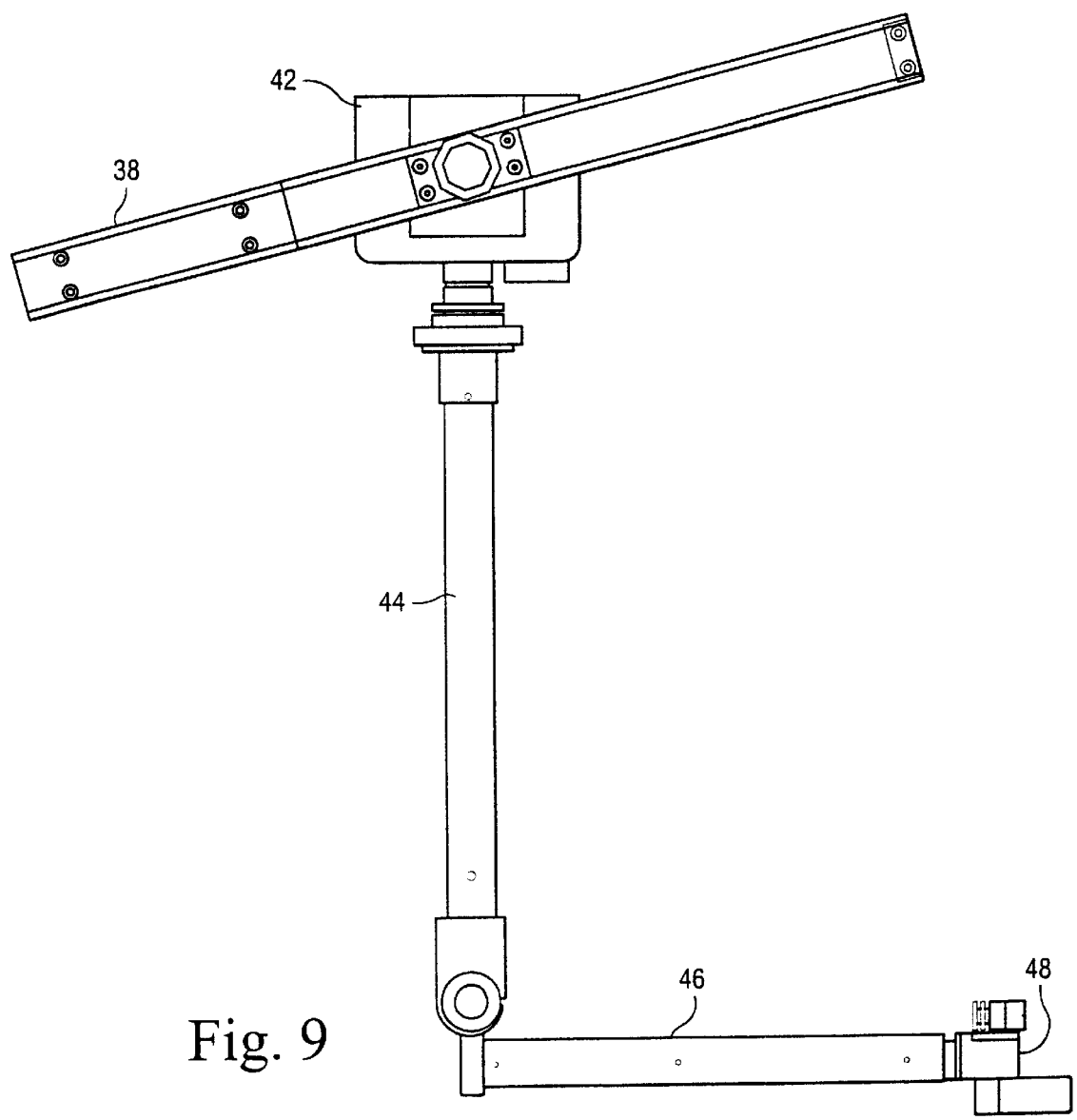
FIG. 9 is a side elevational view in a plane containing the axis of rotation of the gas turbine rotor illustrating a rail mounting a shoulder gearbox, in turn mounting the upper arm and forearm of the exterior manipulator.

Turning now to the details of the external manipulator 20 and referring to FIGS. 6–8, it will be appreciated that the mast 34 (FIG. 6) is supported externally of casing 12 and is preferably fixed to the casing. As illustrated in FIGS. 4 and 5 and to inspect the impingement sleeve, the carriage 32 is disposed within the casing 12 and supported by mast 34. Referring to FIGS. 7 and 8, support carriage 32 includes spaced mounting plates 70 and a gear carriage 72 between plates 70. Gear carriage 72 includes a centrally located spur gear 74 driven by the shaft 76 of an electric motor 78 carried within a housing 80 secured to the support carriage 32. Plates 70 also carry rollers 82 at opposite ends of the carriage 32 for supporting the arcuate segments 36, as well as side rollers 84 affording lateral support for the segments. As illustrated in FIG. 8, each arcuate segment is in the form of an I-beam 86 and includes a rack gear 88 along an upper surface of the segment. It will be appreciated that the engagement between motor-driven gear 74 carried by the gear carriage 72 and rack 88 drives the arcuate segment 36 along the carriage 32.

To facilitate insertion and removal of the arcuate segments, the gear carriage 72 is pivoted at one end about a pin 92. A spring-biased shaft 94 biases the opposite end of the gear carriage 72 such that the gear 74 is biased into engagement with the rack gear 88. By displacing the shaft 94 upwardly in FIG. 7, the gear 74 is disengaged from the rack gear 88, enabling the segments to freely slide on the rollers 82 along the carriage 32. Carriage 32 also includes a pair of cable guide wheels (FIG. 7) 90 for guiding electrical cables, not shown, along the arcuate segments 36 for controlling the various motors of the external manipulator.

Referring now to FIG. 6, the ends of the arcuate segments 36 have dovetail connections one with the other. That is, each female dovetail 83 may receive the male dovetail 85 of an adjoining segment such that the segments can be assembled within the casing 12. It will be appreciated that the distal end of the first inserted segment carries the robotic subassembly 39 including rail 38, shoulder gearbox 42, upper arm 44, forearm 46 and inspection tool 48. On the end of the distal segment 36, a pin connection is provided to secure the distal segment and the rail 38 to one another such that the rail 38 extends from the arcuate segment in a general axial direction (see FIGS. 3–5) and to opposite axial sides of the distal segment. The pin connection is illustrated in FIG. 10 by the female recess 96 and pin 97 coupled to a support 99 secured to rail 38 intermediate opposite ends of the rail. At the distal end of rail 38 there is provided a gearbox 98 having a drive gear 100, an idler gear 101, and a driven gear 102. Gear 100 is driven directly by an electric motor 104 carried by rail 38. Drive gear 100 drives driven gear 102 through the idler gear 101. Mounted on gear 102 is a lead screw 108 extending the length of rail 38. A nut, not shown, fixed to the slider 40, is threaded about the lead screw 108. The slider 40 is mounted on rail 38 by rollers whereby the slider 40 traverses the length of rail 38 upon rotation of the lead screw 108.

Referring to FIGS. 11 and 12, the shaft 120 of the shoulder gearbox 42 is keyed and secured to the slider 40 at the projecting end 121, i.e., the shaft 120 does not rotate relative to slider 40. Consequently, the shaft 120 and shoulder gearbox 42 translate with slider 40 linearly along the rail 38 upon rotation of lead screw 108. The gearbox 42, however, rotates about shaft 120. To accomplish this, a gear 122 is rigidly mounted on the shaft 120, i.e., the shaft 120, gear 122 and slider 40 are rigidly connected with one another. A motor 124 is mounted on gearbox 42 and drives a gear 126 in engagement with gear 122. Since gear 122 is fixed to shaft 120, actuation of drive motor 124 rotates gears 126 and 122, causing the gearbox 42 to rotate about shaft 120, i.e., first axis 53 (FIG. 3).

Additionally, the shoulder gearbox includes a motor 150 (FIG. 11) for rotating the upper arm 44. The upper arm 44 is mounted on a bearing 152 surrounding a fixed stub shaft 154 coupled to the housing of the gear box 42. A thrust bearing 156 carries the upper arm 44 for rotation. A gear 158 is connected to the outer tube 160 of the upper arm 44 and engages a gear 162 on the shaft 164 of motor 150. Consequently, by actuating motor 150 in either direction, the gear drive rotates the upper arm 44 about its own axis, i.e., rotational axis 45 (FIGS. 3 and 11).

Figure 3:
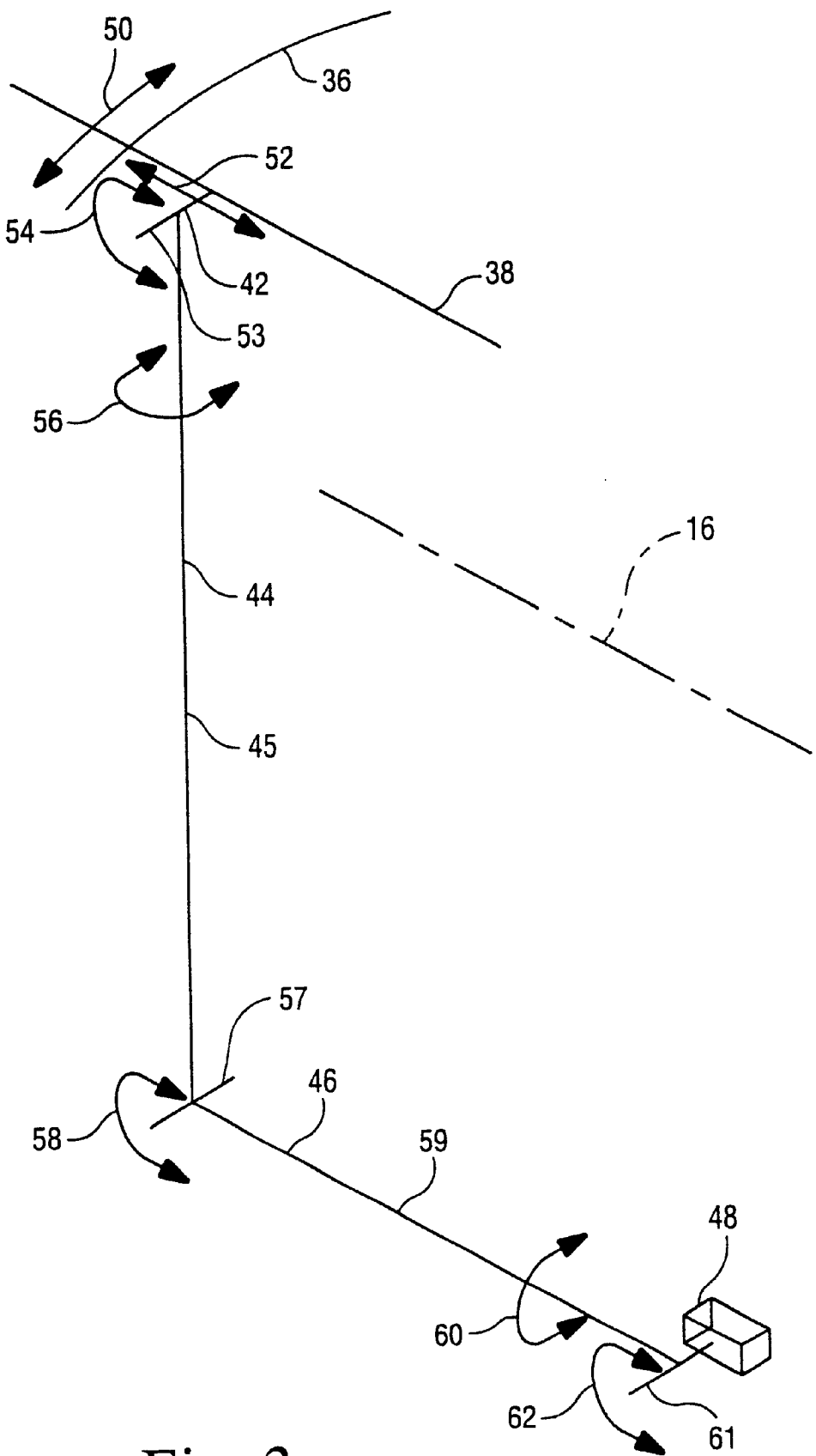
FIG. 3 is a schematic illustration of the movements of an inspection head of an exterior manipulator for inspecting exterior portions of the impingement sleeve of the transition piece.
Figure 13:
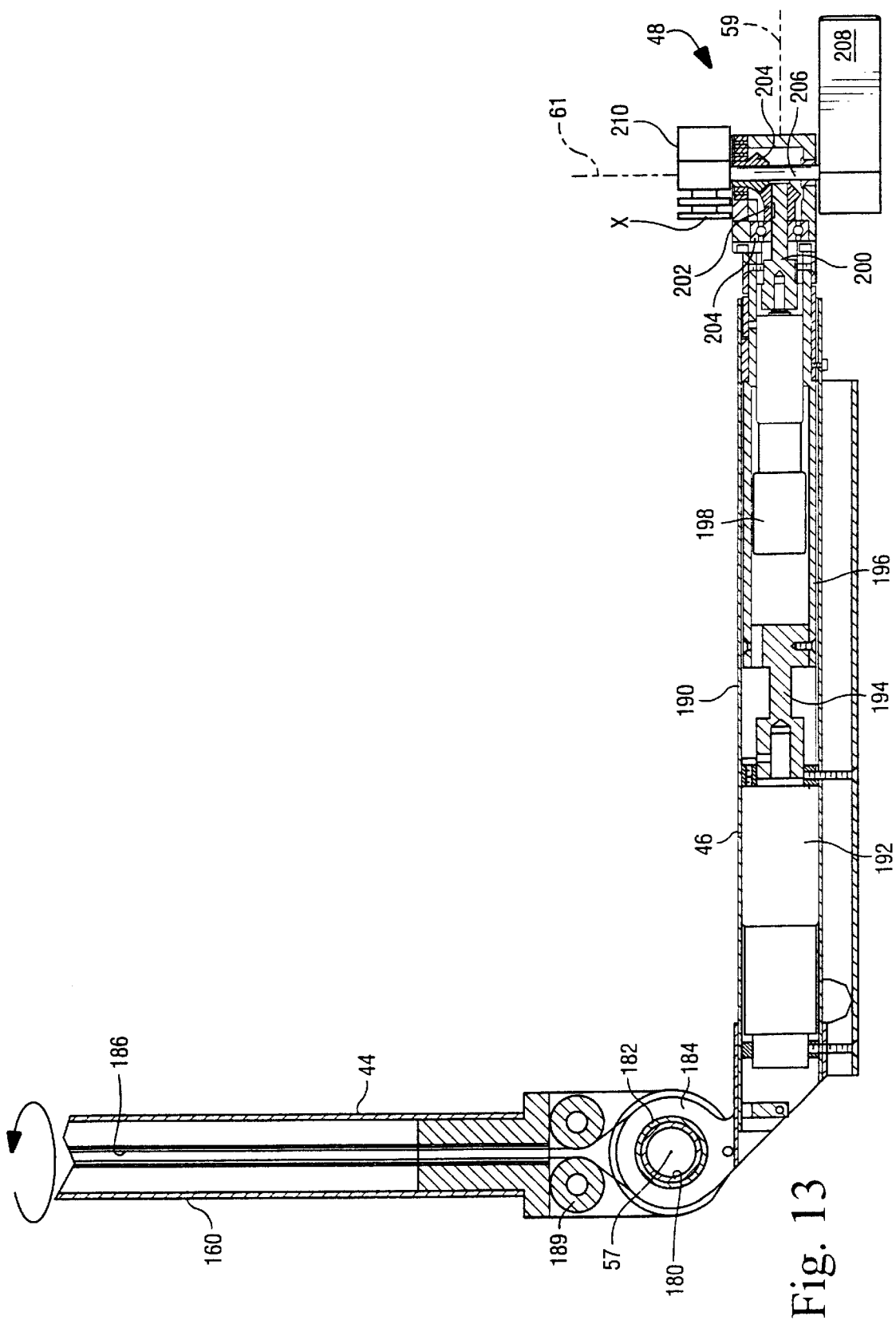
FIG. 13 is a fragmentary view of the lower end of the upper arm, its joint with the forearm, the forearm and inspection head mounted on the end of the forearm.

Referring to FIG. 13, the forearm 46 is secured to the distal end of the upper arm 44 for pivotal movement about the second axis 57 (FIGS. 13 and 3). Particularly, upper arm 44 carries a bearing sleeve 180 (FIG. 13) surrounded by a bushing 182 carried by the forearm 46. A drive pulley 184 is carried on the bushing 182 and cables 186 are wrapped about pulley 184 for pivoting the forearm 46 about axis 57 and relative to the upper arm 44. Particularly, cables 186 are wrapped about a cable drum 187 (FIGS. 11 and 12) and extend past idler rolls 185 (FIG. 11), through an interior guide tube 188, about idler rolls 189 and about drive pulley 184. To pivot the forearm 46 relative to the upper arm, a drive motor 191 (indicated by the dashed lines in FIG. 12) is mounted to gearbox 42 and has a drive shaft 193 carrying a gear 195. Gear 195 engages a gear 197 mounted for rotation on shaft 120. Gear 197 is coupled to cable drum 187. By actuating motor 191, the cable drum is rotated, driving the cables 186 and hence pivoting forearm 46 relative to upper arm 44 above second axis 57.

The forearm 46 preferably includes an outer tube 190 (FIG. 13) to which is fixed a pan motor 192 internally within tube 190. The shaft 194 driven by motor 192 is connected to the proximal end of an interior rotatable tube 196 concentric within outer tube 190. The distal end of tube 196 is connected to the inspection head 48. Thus, actuation of motor 192 rotates inspection head 48 about the long axis of forearm 46, i.e., about a pan axis 59 (FIGS. 3 and 13).

Within inner tube 196 is a tilt drive motor 198 which drives a shaft 200, in turn coupled to a bevel gear 202. The shaft 200 is mounted in a bearing 204, the outer race of which is carried by inner tube 196. Bevel gear 202 lies in meshing engagement with a driven bevel gear 204 mounted on a tilt axis shaft 206, suitable bearings being provided for the shaft 206. Actuation of motor 198 thus rotates inspection head 48 about the axis of shaft 206, i.e., about tilt axis 61 (FIGS. 3 and 13). The inspection head 48 includes various instruments such as a camera 208 and a light assembly 210, both mounted on the shaft 206. Consequently, actuation of tilt motor 198 rotates the camera and light assembly about the tilt axis to the desired positions.

In operation, the exterior manipulator carriage 32 is disposed in the access opening 18 of the gas turbine and secured by securing the mast 34 to the casing 12. The first arcuate segment carrying the rail 38, gearbox 42, upper arm 44, forearm 46 and head 48 is inserted through the access opening and along carriage 32. The carriage 32 supports the assembly within the casing 12. The remaining arcuate segments 36 are connected to one another end-to-end by the dovetail connections and passed through carriage 32. With the upper arm 34 and forearm 46 folded against one another in a retracted position paralleling rail 38 and retracted along the rail to the proximal end thereof directly adjacent the end arcuate segment 36 as illustrated in FIG. 4, the inspection head 48 can be advanced about a quadrant of the combustion casing and in a circumferential direction by actuation of motor 78 until it lies adjacent the impingement sleeve sought to be inspected. That is, the subassembly 39 is advanced in a circumferential direction in the radial space between the impingement sleeve 26 and the interior of casing 12 until it lies adjacent the impingement sleeve to be inspected. With the manipulator in the position illustrated in FIG. 4 between adjacent transition pieces and radially outwardly thereof, the upper arm 44 can be rotated and forearm 46 displaced from its folded position against upper arm 44 into positions to locate the inspection head 48 adjacent the area of the transition piece, i.e., impingement sleeve 26, to be inspected. For example, if the area to be inspected is to one side of the impingement sleeve, the drive motor 124 in the shoulder gearbox 42 is energized to rotate the shoulder gearbox 42 about shaft 120, i.e., axis 53. Additionally, the cable drum 126 is rotated by actuation of the motor 191 to pivot the forearm 46 relative to the upper arm 44 about axis 57 into the position illustrated in FIG. 5. Motor 104 is also actuated and displaces the shoulder gearbox 42 linearly along the rail 38. By translating the gearbox 42 along the rail 38, the axial position of the inspection head 48 in relation to the area desired to be inspected is obtained. Actuation of pan and tilt motors 192 and 198, respectively, position the inspection head 48 and particularly the camera and light assembly in registration with the desired inspection area. Consequently, visual inspection by video camera and measurements of the desired area are obtained. In the event the underside of the impingement sleeve is to be inspected, the shoulder gearbox 42 is rotated about axis 53 to locate the elbow, i.e., the joint between upper arm 44 and forearm 46 below, i.e., radially inwardly of, the impingement sleeve. Motor 191 is also actuated to rotate the forearm 46 about axis 57 to locate it below, i.e., radially inwardly of the impingement sleeve. Motor 150 is also actuated to rotate the upper arm 44 about its own axis 45, thus causing the forearm 46 to swing about the axis of upper arm 44 and below the impingement sleeve. By actuation of the pan and tilt motors 192 and 198, the camera and light assembly can be focused on the area sought to be inspected. Thus, it will be appreciated that by selective actuation of the various motors and positioning the exterior manipulator on opposite sides of the selected impingement sleeve, the entirety of the exterior surface of each of the impingement sleeves for each combustor can be visually inspected and measurements taken in situ. Note that the motors are all electrically driven remotely from outside the turbine casing through suitable electrical connections therewith. The motors can be actuated manually but are preferably computer controlled.

Figure 14:
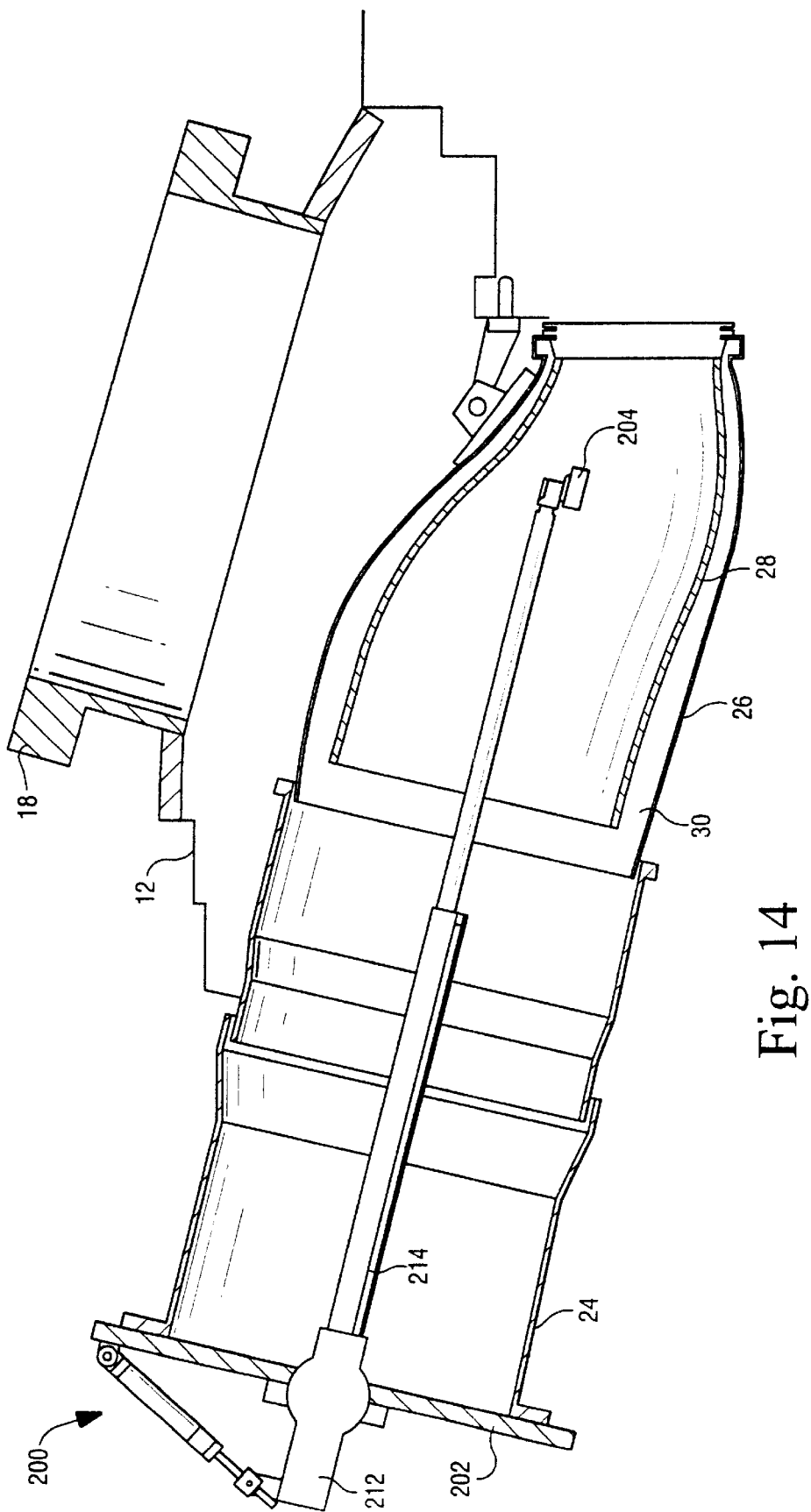
FIG. 14 is a view similar to FIG. 2 illustrating an interior manipulator forming part of an inspection tool according to the present invention.
Figure 15:
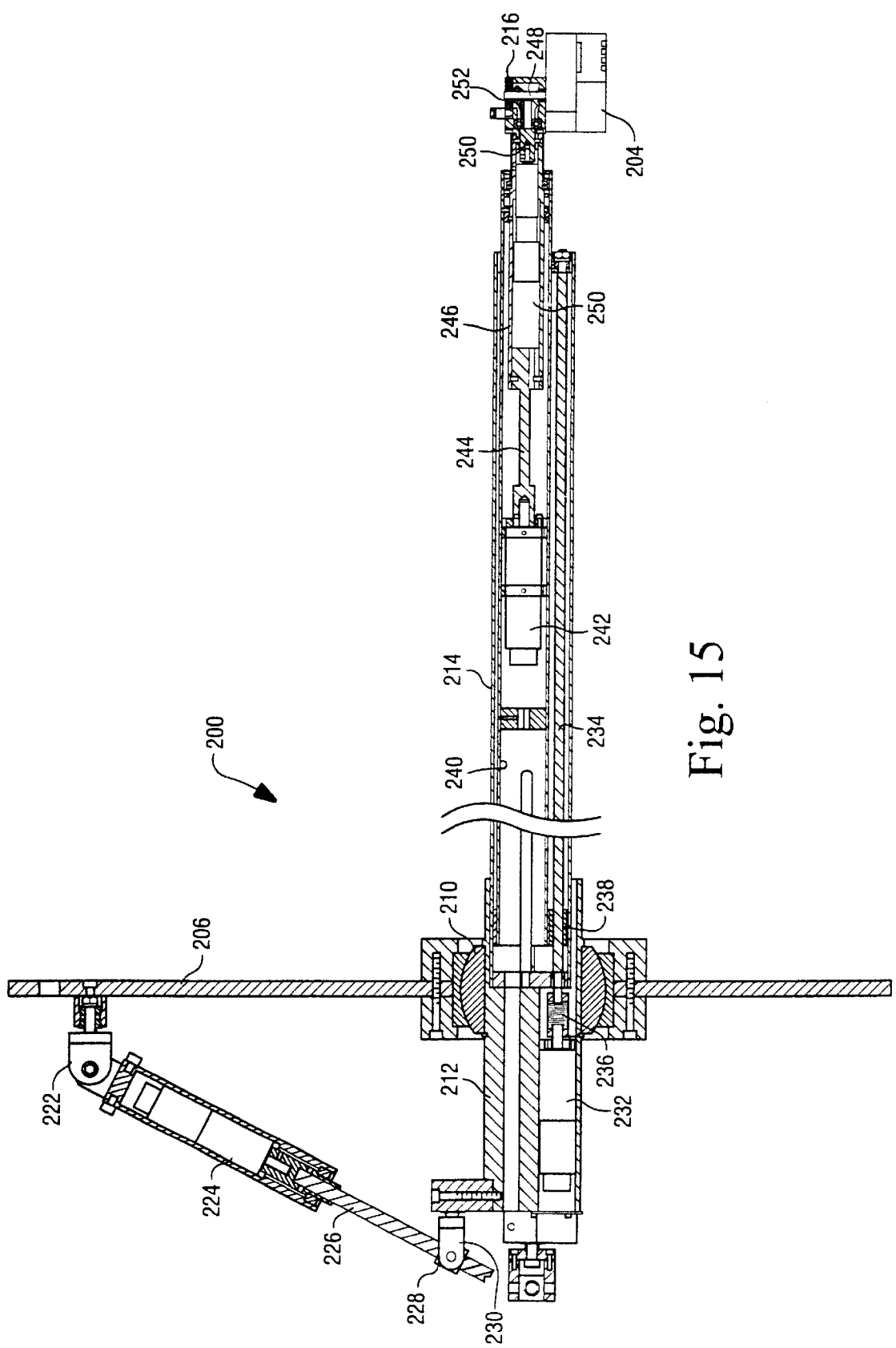
Figure 16:
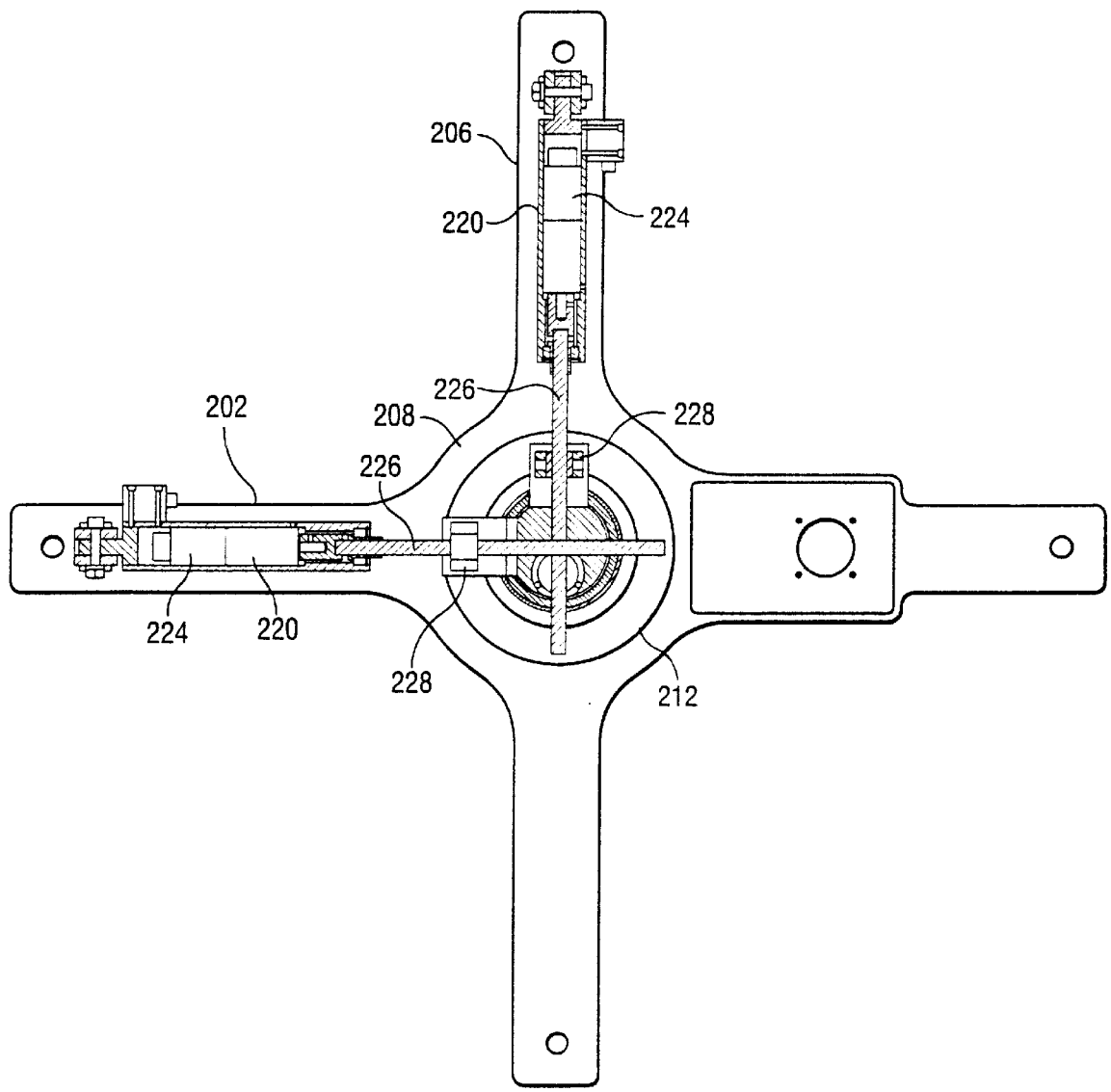
FIG. 16 is an end view of the mounting for the interior manipulator with parts in cross-section.

Referring now to FIGS. 14, 15 and 16, there is illustrated an interior manipulator, generally designated 200, for inspecting the interior surface of the transition piece body 28. Referring to FIG. 14, the interior manipulator 200 includes a mount 202 at one end of the tool and an inspection head 204 at the opposite end of the tool carrying, for example, a similar camera and light assembly as the exterior manipulator. The mount 202 is in the form of a cross (FIG. 16) having legs 206 90° from one another. The legs 206 are mounted to the flanges of the combustion casing to secure the interior manipulator thereto. The central portion 208 of the mount 202 includes a spherical bearing 210 carried on a tubular section 212 projecting outwardly of the mount 202. On the inside of the mount 202 and carried by the tubular section 212 is an outer tube 214 for carrying the inspection head 204.

In order to manipulate the inspection head 216 within the transition piece body 28, a pair of linear actuators 220 are coupled between the outer ends of a pair of legs 206, respectively, and the outer end of the tubular section 212. Particularly, each linear actuator 220 is pivotally secured to a clevis 222 mounted to the outer end of a leg 206. The actuator 220 includes a motor 224 which drives a lead screw 226 engaged in a threaded nut 228 mounted on a hinge 230. The hinge 230 is, in turn, mounted on the tubular section 212. By locating the linear actuators 220 90° apart, it will be appreciated that actuation of the motors 224 pivots the inspection head 216 about the spherical bearing 210 toward and away from the transition piece body 28.

Additionally, by extending or retracting the inspection head 204, the inspection head can be located adjacent any interior surface portion of the transition piece body 28. To accomplish the telescoping movement, a motor 232 is carried by the tubular section 212. Motor 232 drives a lead screw 234 via a shaft coupling 236. A lead screw nut 238 is secured to an inner tube 240 concentric with outer tube 214. By actuating motor 232 and rotating lead screw 234 in engagement with nut 238, tube 240, which mounts the inspection head 204, can be advanced and retracted in an axial direction.

To rotate the inspection head 204 about its own axis, i.e., to pan the inspection head, a pan motor 242 drives a shaft 244, in turn coupled to a tube 246 carrying the inspection head 204. Thus, by actuating motor 242 and rotating shaft 244, tube 246 and head 204 are rotated about the axis of the outer tube 214. To rotate the inspection head 204 about a tilt axis 248, a tilt motor 250 is provided and drives the inspection head about axis 248 through a shaft and beveled gear connection 250 and 252, respectively, similarly as previously described with respect to the exterior manipulator. It will be appreciated that the section 212 and tubes, i.e., members 214, 240 and 246 are collectively called the inspection arm.

The operation of the interior manipulator is believed self-evident from the foregoing description. Upon securing mount 202 of the interior manipulator to the flange of the combustor, actuation of the linear motors 224 and 232 locate the inspection head 204 closely adjacent to a selected interior surface portion of the transition piece body sought to be inspected. By actuating motors 242 and 250, the inspection head is rotated about pan and tilt axes and directed such that the light assembly illuminates the surface portion to be inspected by the video camera of head 204.

Figure 18:
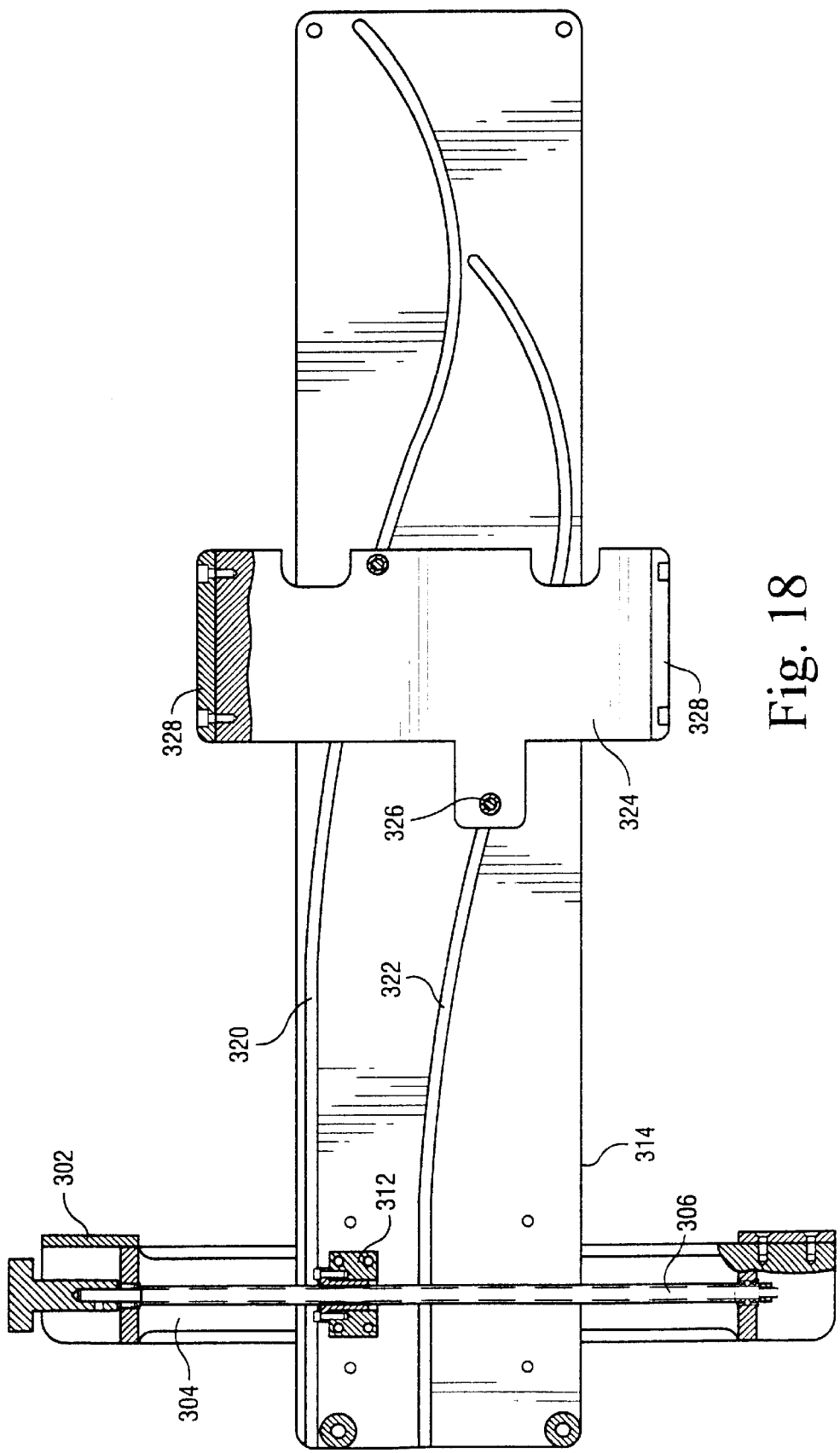
FIG. 18 is a cross-sectional view of the annulus manipulator taken about on line 18—18 in FIG. 17.

Referring now to the annulus manipulator illustrated in FIGS. 17–20, the inspection head which preferably carries a camera and a light assembly similar to the previously described inspection heads is positioned in the annulus 30 between the transition piece body 28 and the impingement sleeve 26. The annulus manipulator is specifically configured to inspect the side seam weld 29 along opposite sides of the transition piece body. It will be appreciated the transition piece body 28 is fabricated in upper and lower halves, with the halves being welded together along weld lines 29 which essentially follow the contour of the shaped upper and lower exterior surfaces of the transition piece body 28. To inspect those welds 29, the annulus manipulator, generally designated 300, includes a pair of mounting plates 302 which are secured by bolts during inspection to the flanges of the combustor casing. Between the mounting legs 302, there is provided a pair of spaced V-rails 304. Extending centrally between the rails 304 is a lead screw 306, terminating at one end in a manually rotatable knob 308 supported by one of the mounting plates 302. The opposite end of the lead screw 306 is journalled into the opposing mounting plate 302. Lead screw 306 extends through a lead nut block 310, secured between and to a pair of spaced guide plates 314. The guide plates 314 are secured to one another by suitable spacers at longitudinally located positions along the lengths of the plates and serve as a guide for guiding an inspection head 347 along the side seam weld 29. Additionally, rollers 316 are provided on the outside of the guide plates 314 for bearing against the rails 304 to maintain the plates 314 in extended positions from the mounting plates 302 as illustrated in FIG. 18. By operation of the knob 308, the guide plates 314 can be displaced accurately toward and away from opposite sides of the transition piece upon insertion of the annulus manipulator into the transition piece.

As best illustrated in FIG. 18, each of the guide plates 314 includes a pair of longitudinally extending contoured surfaces, i.e., grooves 320 and 322. The grooves of each plate 314 register with corresponding grooves of the opposite plate. Disposed between the guide plates 314 is a middle carriage plate 324 which carries a pair of guide pins 326 projecting from each of its opposite sides and engaging in the grooves 320 and 322, respectively. It will be appreciated that the middle carriage plate 324 is slidable lengthwise along the spaced guide plates 314 and along the grooves 320 and 322 of the guide plates 314, the middle carriage plate 324 serving as a cam follower with respect to the contoured surfaces 320 and 322. Opposite ends of the middle carriage plate 324 mount transversely extending end carriage plates 328. Along the outside side faces of the guide plates 314 are side carriage plates 330 (FIG. 19) which extend between the outer edges of the end carriage plates 328. Thus, the middle carriage plate 324 and end carriage plates 328 form essentially an I-beam with the side carriage plates 330 extending parallel to the middle carriage plate 324 and between end edges of the end carriage plates 328 along outside surfaces of the guide plates 314.

On each of the exterior surfaces of the side carriage plates 330, there is provided an arm 332 pivotal about a pin 334. Each side carriage plate 330 mounts a pair of bearings 336 through which a lead screw 338 is rotatable. Lead screw 338 is rotatable on a nut 340 pivotally carried on the upper end of arm 332. Nut 340 is also movable vertically relative to its mounting 341 on arm 332. By rotating the lead screw, the nut 340 causes the arm 332 to pivot about pin 334 to provide a finite adjustable angular movement of the inspection head, as described below.

Figure 19:
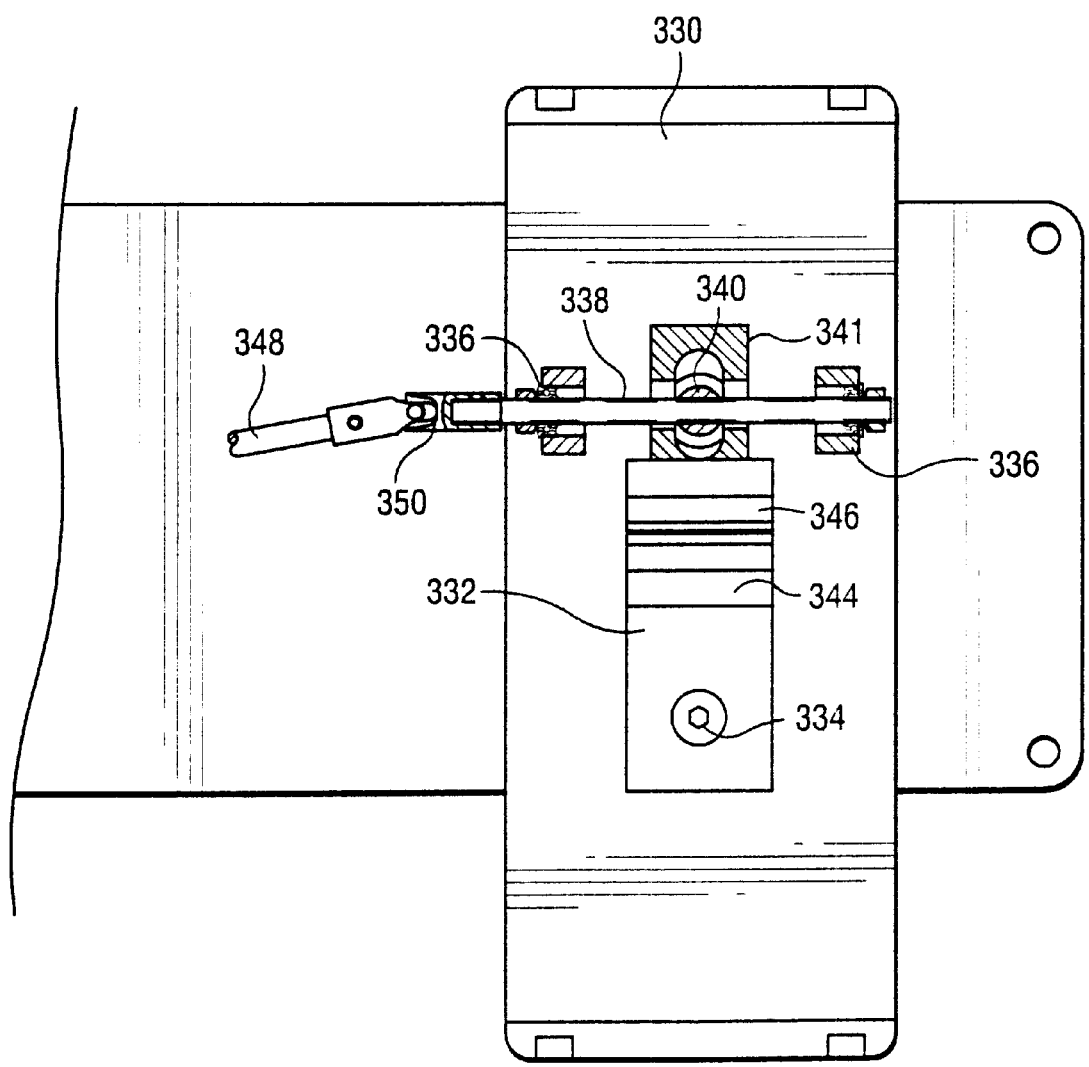
FIG. 19 is a side elevational view of the distal end of the annulus manipulator.

On each side of each side carriage plate 330, there is provided a mounting block 344 (FIGS. 17 and 19). A wand holder 346 is pinned to one of the mounting 344. The lateral outer end of the wand holder 346 is adapted to receive a wand tube 348, illustrated in FIG. 20, on the end of which is mounted an inspection head 347. Head 347 includes a light assembly 349 and a video camera 351.

A carriage handle 348 is coupled by a universal joint 350 with the lead screw 338, the handle 348 extending the length of the annulus manipulator for manipulation externally thereof. By rotating the carriage handle 348, the arm 332 carrying the wand tube 348 in the wand holder 346 can be pivoted to finitely locate the inspection head 347 along the weld seam 29.

In using the annulus manipulator, the mount 302 is secured to the flange of the combustion casing, with the middle and side carriage plates 324 and 330, respectively, extending into the transition piece, terminating short of the transition piece body 28. The wand tube 353 with the inspection head 347 is mounted to the wand holder 346 extends the length of the annulus manipulator. The middle and side carriage plates are jointly advanced along the guide plates 314 by pushing on the carriage handle 348. The inspection head 347 is thus guided into the space between the transition piece body 28 and the impingement sleeve 26. As the inspection head 347 is advanced into the annulus, the side carriage plates 330 are guided by the movement of the middle carriage plate 324 along the grooves 320 and 322 to follow the contour of the side seam weld 29. With the inspection head mounted on one of the side carriage plates 330, the inspection head likewise follows the contour of the side seam weld 29. The video camera and light assembly forming part of inspection head 347 thus register with the side weld 29 and record the integrity of the side seam weld. By threading or unthreading the lead screw 338, the angle of the camera 351 and light assembly 349 can be finitely adjusted within the annulus to view appropriate areas on either side of the weld seam and/or to ensure registration of the camera and light assembly with the weld. After the inspection of one side weld seam, the annulus manipulator is retracted and the wand carrying the inspection head 347 is secured to the mounting block 344 carried by the other side carriage plate 330. The plates 324 and 330 are then advanced following the contours of the grooves 320 and 322 whereby the inspection head traverses along and inspects the opposite side weld seam.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for in situ inspection of the exterior surface of an impingement sleeve of one of a plurality of an annular array of combustors for a gas turbine wherein the turbine has an outer casing about an axis of rotation of a turbine rotor and at least one opening through the casing for access to the impingement sleeve, comprising:

a manipulator having an arcuate segment and a carriage for supporting the segment within the casing, said carriage mounting said arcuate segment, for movement in a circumferential direction relative to the carriage and about the annular array of combustors;

a linear extending rail carried by said segment for circumferential movement therewith;

a first arm carried by said rail for translatory movement therealong and pivotal movement relative to said rail about a first axis;

a second arm coupled at one end to said first arm for pivotal movement about a second axis normal to a plane containing said first arm and said second arm; and an inspection head carried by said second arm adjacent an opposite end thereof for pivotal movement about pan and tilt axes perpendicular to one another.

2. Apparatus according to claim 1 wherein said first arm is elongated and carried by said rail for rotation about an axis extending lengthwise along said first arm.

3. Apparatus according to claim 1 wherein said second arm is elongated and is rotatable about an axis extending lengthwise along said second arm.

4. Apparatus according to claim 1 wherein said second arm is elongated and said pan axis comprises an axis parallel to an axis extending lengthwise of said second arm.

5. Apparatus according to claim 1 wherein said tilt axis lies parallel to one of said first and second axes.

6. Apparatus according to claim 1 wherein said first arm is elongated and carried by said rail for rotation about an axis extending lengthwise along said first arm, said second arm being elongated and rotatable about an axis extending lengthwise along said second arm, said first and second axes lying parallel to one another, said pan axis extending parallel to the rotational axis of said second arm and said tilt axis lying parallel to said first and second axes.

7. Apparatus for in situ inspection of the exterior surface of an impingement sleeve of one of a plurality of an annular array of combustors for a gas turbine wherein the turbine has an outer casing about an axis of rotation of a turbine rotor and at least one opening through the casing for access to the impingement sleeve, comprising:

a manipulator having an arcuate segment and a carriage for supporting the segment within the casing, said carriage mounting said arcuate segment for movement in a circumferential direction about the annular array of combustors;

a linear extending rail carried by said segment;

a first arm carried by said rail for translatory movement therealong and pivotal movement relative to said rail;

a second arm connected to said first arm for pivotal movement;

an inspection head carried by said second arm for movement about pan and tilt axes perpendicular to one another;

said segment including a plurality of discrete arcuate segments connected endwise to one another and extending arcuately about at least the one combustor and a slider for sliding along said rail and carrying said first and second arms and said inspection head.

8. Apparatus according to claim 1 wherein the first and second arms are pivotally carried by said rail and said first arm, respectively, for pivotal movement about axes extending generally normal to one another.

* * * * *

UNITED STATES PATENT AND TRADEMARK OFFICE
CERTIFICATE OF CORRECTION

PATENT NO.   : 6,525,500 B2
DATED        : February 25, 2003
INVENTOR(S)  : Hatley et al.

It is certified that error appears in the above-identified patent and that said Letters Patent is hereby corrected as shown below:

Column 11,
Line 14, insert -- blocks -- after "one of the mounting".

Signed and Sealed this

Thirteenth Day of May, 2003

JAMES E. ROGAN
*Director of the United States Patent and Trademark Office*